(12) United States Patent
Mai

(10) Patent No.: US 7,404,659 B2
(45) Date of Patent: Jul. 29, 2008

(54) BACKLIGHT MODULE

(75) Inventor: Chien-Chin Mai, No. 6, Gongye 2nd Rd., Renwu Shiang, Kaohsiung County 814 (TW)

(73) Assignees: Chien-Chin Mai, Kaohsiung County (TW); Gamma Optical Co., Ltd., Kaohsiung County (TW)

( * ) Notice: Subject to any disclaimer, the term of this patent is extended or adjusted under 35 U.S.C. 154(b) by 0 days.

(21) Appl. No.: 11/561,895

(22) Filed: Nov. 21, 2006

(65) Prior Publication Data

US 2008/0117650 A1    May 22, 2008

(51) Int. Cl.
*F21V 7/04* (2006.01)
(52) U.S. Cl. ................. 362/606; 362/619; 362/625
(58) Field of Classification Search ......... 362/330, 362/332, 339, 606, 607, 614, 615, 617, 618, 362/619, 620, 623, 624, 627; 349/57, 64; 359/599, 837
See application file for complete search history.

(56) References Cited

U.S. PATENT DOCUMENTS

| | | | | |
|---|---|---|---|---|
| 6,354,709 B1 * | 3/2002 | Campbell et al. | ............ | 362/627 |
| 6,478,438 B1 * | 11/2002 | Ishikawa et al. | ............ | 362/620 |
| 6,712,481 B2 * | 3/2004 | Parker et al. | ................ | 362/619 |
| 7,128,456 B2 * | 10/2006 | Yamashita et al. | .......... | 362/606 |

* cited by examiner

*Primary Examiner*—Y My Quach Lee
(74) *Attorney, Agent, or Firm*—Leong C. Lei

(57) ABSTRACT

A backlight module includes at least a light guide board, a reflector film, an optic film, and a light scarce. The light guide board has a light emitting surface on which a plurality of light: converging elements is formed. The optic film has a surface on which a plurality of rib-like micro light guides is formed. Each micro light guide includes a plurality of ridges, which are of different heights and show variation of height. Either a high ridge or a low ridge of the micro light guide is made a continuous left-and-right wavy configuration and/or a continuous up-and-down height-variation configuration. Thus, light transmitting through, the optic film and converged by the micro light guides leaves the optic film in a form that is not very regular so as to facilitate subsequent use of the light in for example a liquid crystal display panel.

12 Claims, 36 Drawing Sheets

BACKLIGHT MODULE

BACKGROUND OF THE INVENTION (a) Technical Field of the Invention

The present invention, relates to a backlight module, and in particular to a backlight module having a light guide board having a light emitting surface on which a plurality of light converging elements is formed and an optic film that forms micro light guides.

(b) Description of the Prior Art

Conventional backlight modules have been of such an improvement mat a light source supplied by the conventional backlight module is converted from a linear light source into a surface light source. However, fee light source is still subject to the constraints imposed by the regularity of prism ribs formed on an optic film, feat constitutes in part fee backlight module. Thus, light from the conventional backlight modules is emitted in fee form of regular straight beam. On the other hand, a liquid crystal display panel comprises thin-film transistors and color filters which are of minute matrix arranged in an opposing manner Thus, when the regular straight beam passes through gaps between units of thin-film transistors and the color filters, diffraction of light occurs, which, forms interference patterns in the liquid crystal display panel And as a consequence, the performance of the liquid crystal display is damaged.

Occurrence of the interference patterns in a specific liquid crystal panel cannot be identified in the site of backlight module manufacturers, and can only be found when a liquid crystal panel in which the backlight module is mounted is actuated. This often causes problems between the backlight module suppliers and the manufacturers of liquid crystal display panels, and is a trouble of pressing need to he overcome.

Therefore, it is desired, to provide a backlight module mat overcomes fee problems discussed above.

SUMMARY OF THE INVENTION

The primary purpose of fee present invention is to provide a. backlight module comprising at least a light guide board, a reflector film, an optic film, and a light source, wherein the light guide board has at least a light incidence surface, a reflection surface, and a light emitting surface. The light emitting surface or me reflection surface forms a plurality of light converging elements, each having a triangular lateral cross section. The optic film, has a surface on which a plurality of rib-like micro light guides is formed. Each micro light guide comprises at least two ridges, which are of different heights, and either one of a high ridge and a low ridge of the micro light guide is made a continuous let-and-right wavy configuration and/or a continuous up-and-down height-variation configuration. Thus, light transmitting through the light converging elements of the light guide board Is not of a regular linear form and contains a beam of continuous curving so as to eliminate induction of interference pattern in for example a liquid crystal display panel when the light transmits through thin-film transistors and color filters of the liquid crystal display panel, and thus enhancing fee brightness of the overall light output.

The foregoing object and summary provide only a brief introduction to the present Invention, To fully appreciate these and other objects of the present, invention as well as the invention itself, all of which will become apparent to those skilled, in the art, the Mowing detailed description of the invention and the claims should be read in conjunction with the accompanying drawings. Throughout the specification and drawings identical reference numerals refer to identical or similar parts.

Many other advantages and features of the present invention will become manifest to those versed In the art upon making reference to the detailed description and fee accompanying sheets of drawings in winch a. preferred structural embodiment incorporating the principles of the present invention is shown by way of illustrative example.

BRIEF DESCRIPTION OF THE DRAWINGS

The present invention will be apparent to those skilled In the art by reading the following description of preferred embodiments thereof, with reference to the attached drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from die scope of the invention as set forth in the appended claims.

Figure 1:
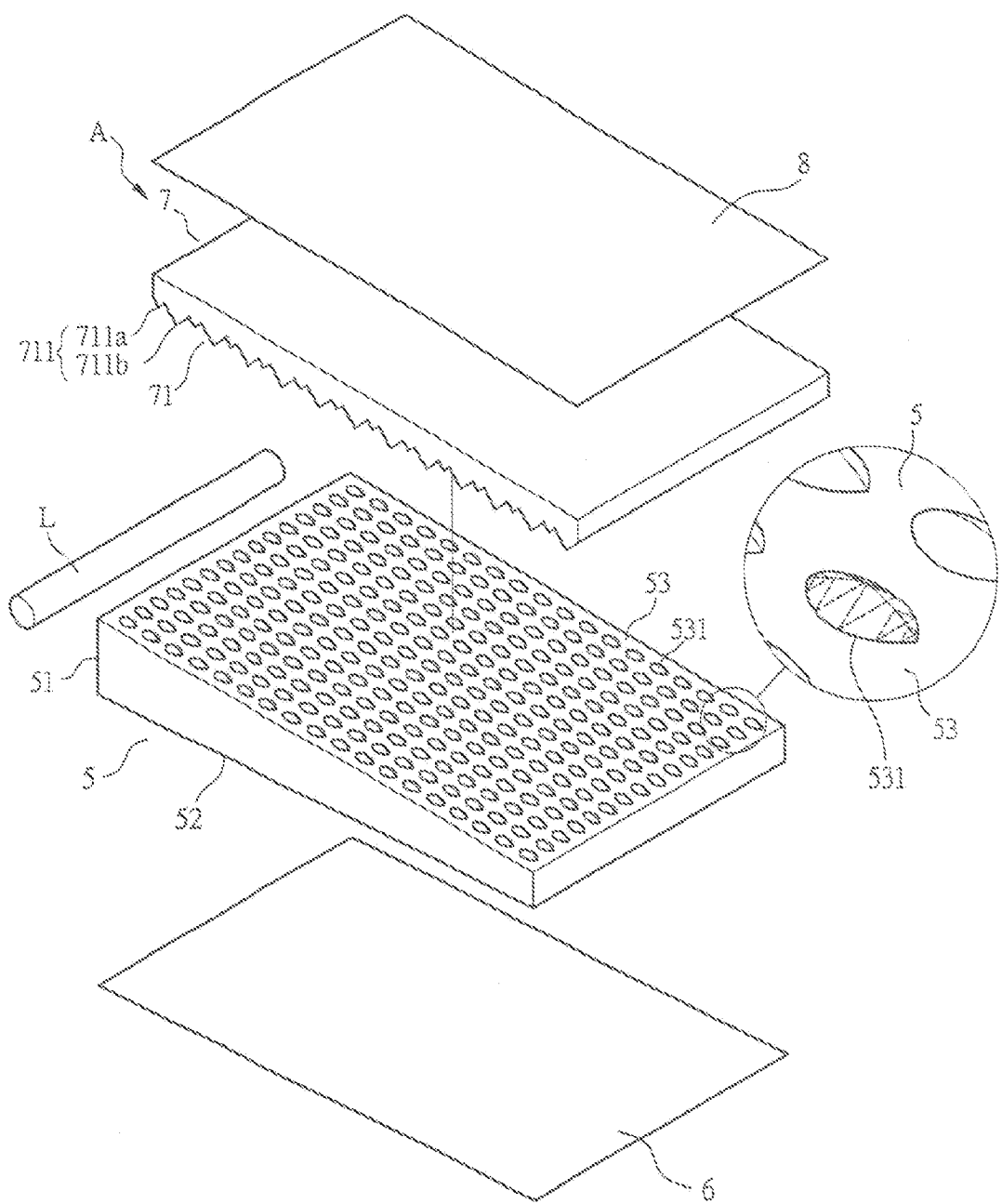
FIG. 1 shows an exploded view of a backlight module constructed in accordance with the present invention.
Figure 2:
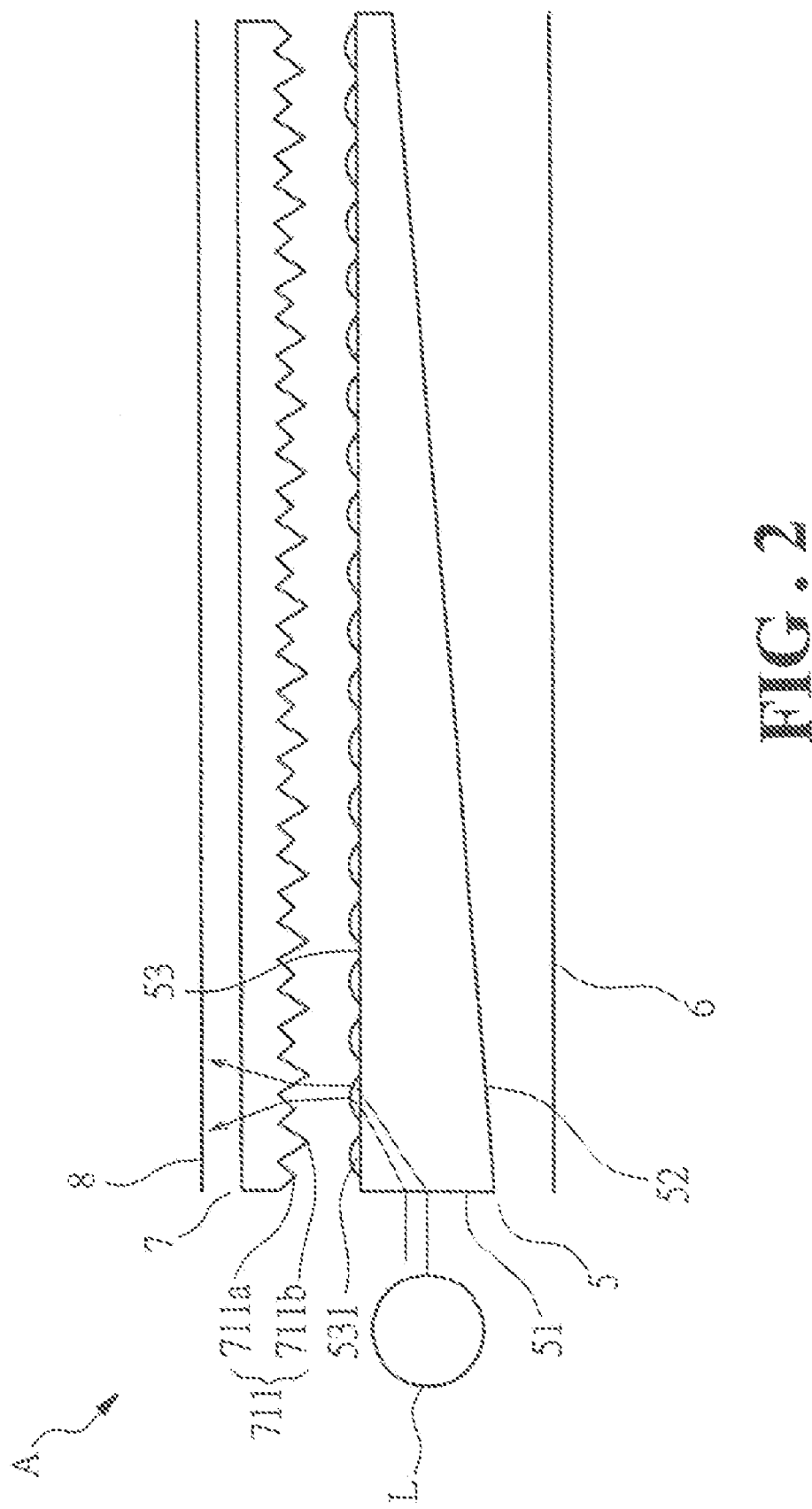
FIG. 2 shows a side elevational view of the backlight module of the present invention.

With reference to the drawings and in particular to FIGS. 1 and 2, a backlight module contracted in accordance with the present, invention, generally designated with reference numeral A, comprises a light guide board 5, a reflector film 6, an optic film 7, an upper diffuser film 8, and a light source L.

Figure 3:
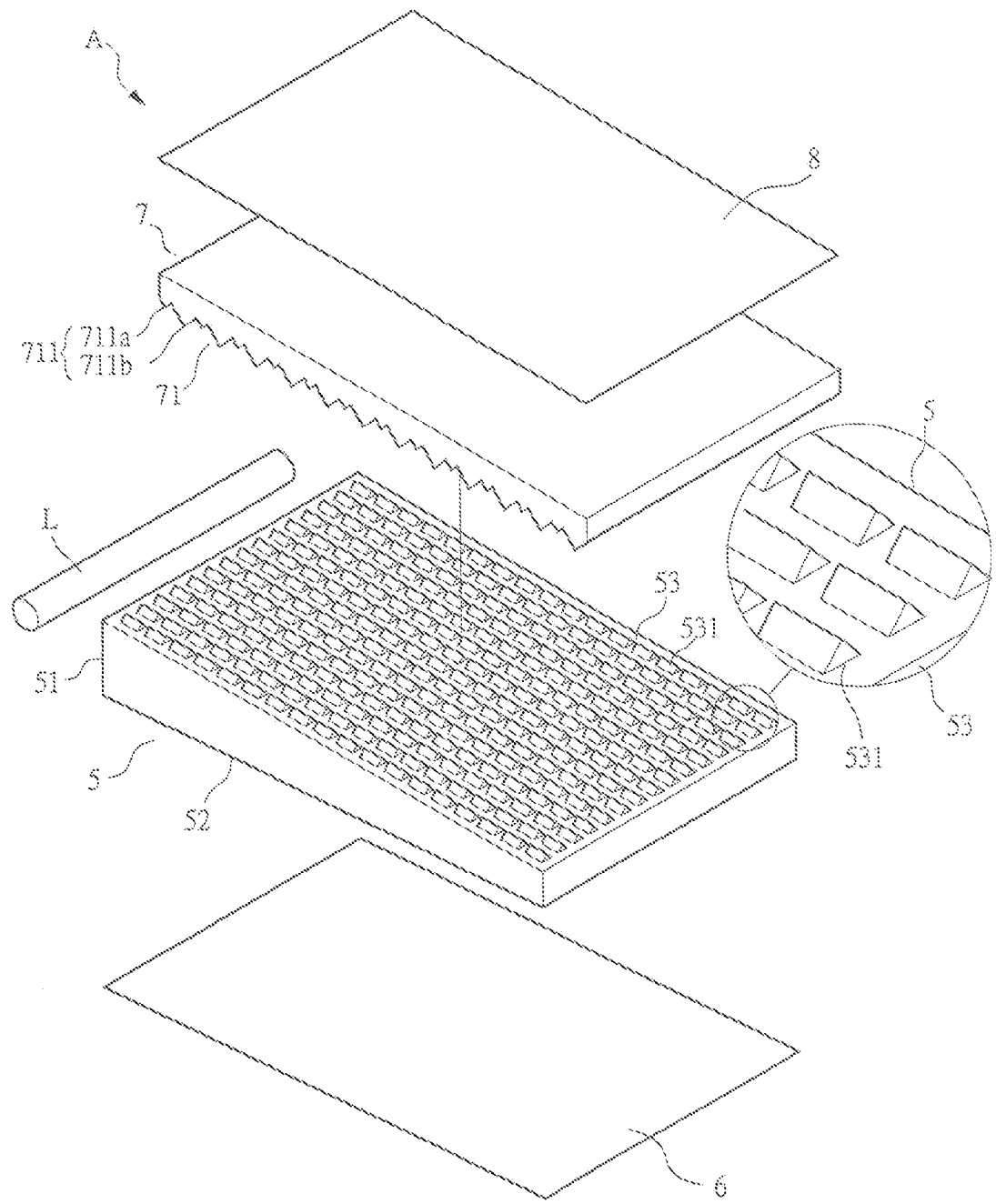
FIG. 3 shows an exploded view of a light guide board of a backlight module constructed in accordance with another embodiment of the present invention.

The light guide board 5 has at least a light incidence surface 51, a reflection surface 52, and a light emitting surface 53. The light emitting surface 53 forms a plurality of light converging elements 531 thereon. Each light converging element 51 has a base that has a geometry comprised of two arcuate lines facing away from each other and intersecting each other. Further, each light converging element 531 is configured to have triangular lateral cross section. The light converging element 531 can be raised and/or recessed with respect to a surface of the light guide board 5. For example, in the embodiment illustrated, the light converging element 531 is raised on the light emitting surface 53 of the light guide board 5. The light converging element 531 has a longitudinal direction pointing toward the light source L. In an alternative embodiment of the light guide hoard 5 In accordance with the present invention, the light converging element 531 that is formed on the light emitting surface 53 can be formed as sectioned triangular prisms that are raised and/or recessed with respect to the light emitting surface 53 of the light guide board 5, as shown in FIG. 3.

The reflector film 6 is laid flat outside the reflection surface 52 of the light guide board 5 to reflect and redirect light transmitting outside fee light guide board 5 back into the light guide board 5.

The optic film 7 is made of a material that has excellent light transmittance. The optic film 7 has a surface on which a plurality of rib-like micro light guides 71 is formed. The rib-like micro light guides 71 can be made of die same material as a body of the optic film 75 or alternatively, the rib-like micro light guides 71 are made of materials different from that making the body of the optic film 7. Bach micro light guide 71 comprises at least two ridges 711, of which the number is taken as two for illustration of the present embodiment The ridges 711 of the micro light guide 71 are of different heights and thus include a low ridge 711a and a high ridge 711b. Use optic film 7 is arranged outside the light emitting surface 53 of die light guide board 5 with the surface of the optic dim 7 that forms fie micro light guides 71 opposing the light emitting surface 53 of foe light guide board 5 and the rib-like micro light guides 71 of die optic film 7 orientated in a direction fiat is not parallel to fie longitudinal direction of the light converging elements 531 of the guide board 5.

The upper diffuser film 8 is arranged on the optic film 7, serving to protect the backlight module A.

Figure 4:
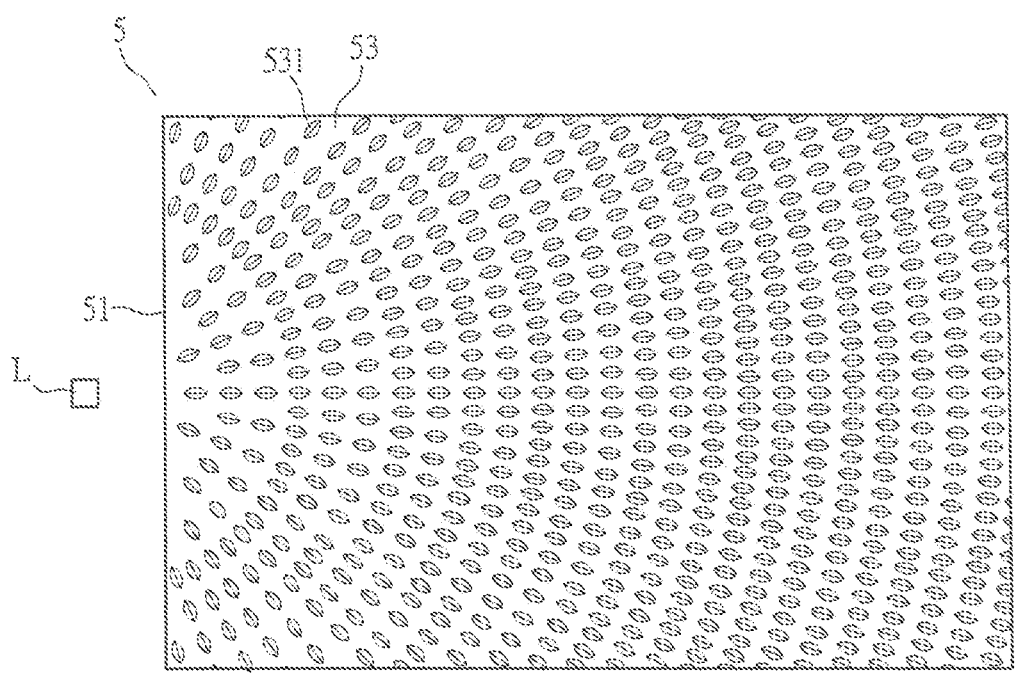
FIG. 4 shows a schematic view demonstrating a distribution of the light converging elements of the light guide board, in accordance wife the present Invention.
Figure 5:
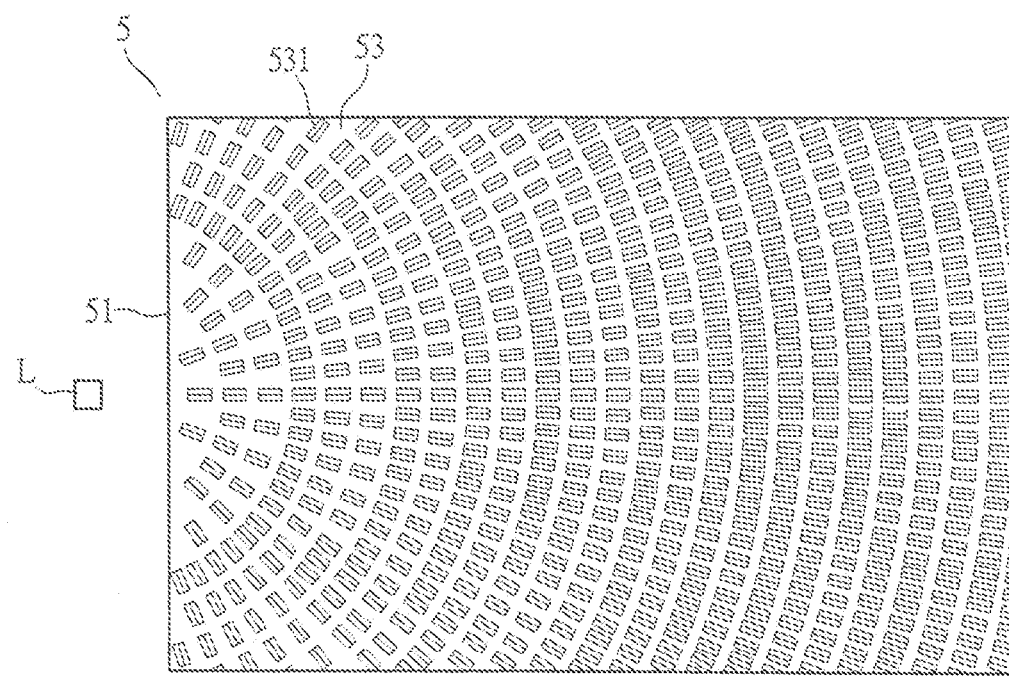
FIG. 5 shows a schematic view demonstrating another distribution of fee light converging elements of the light guide board in accordance wife the present Invention.
Figure 6:
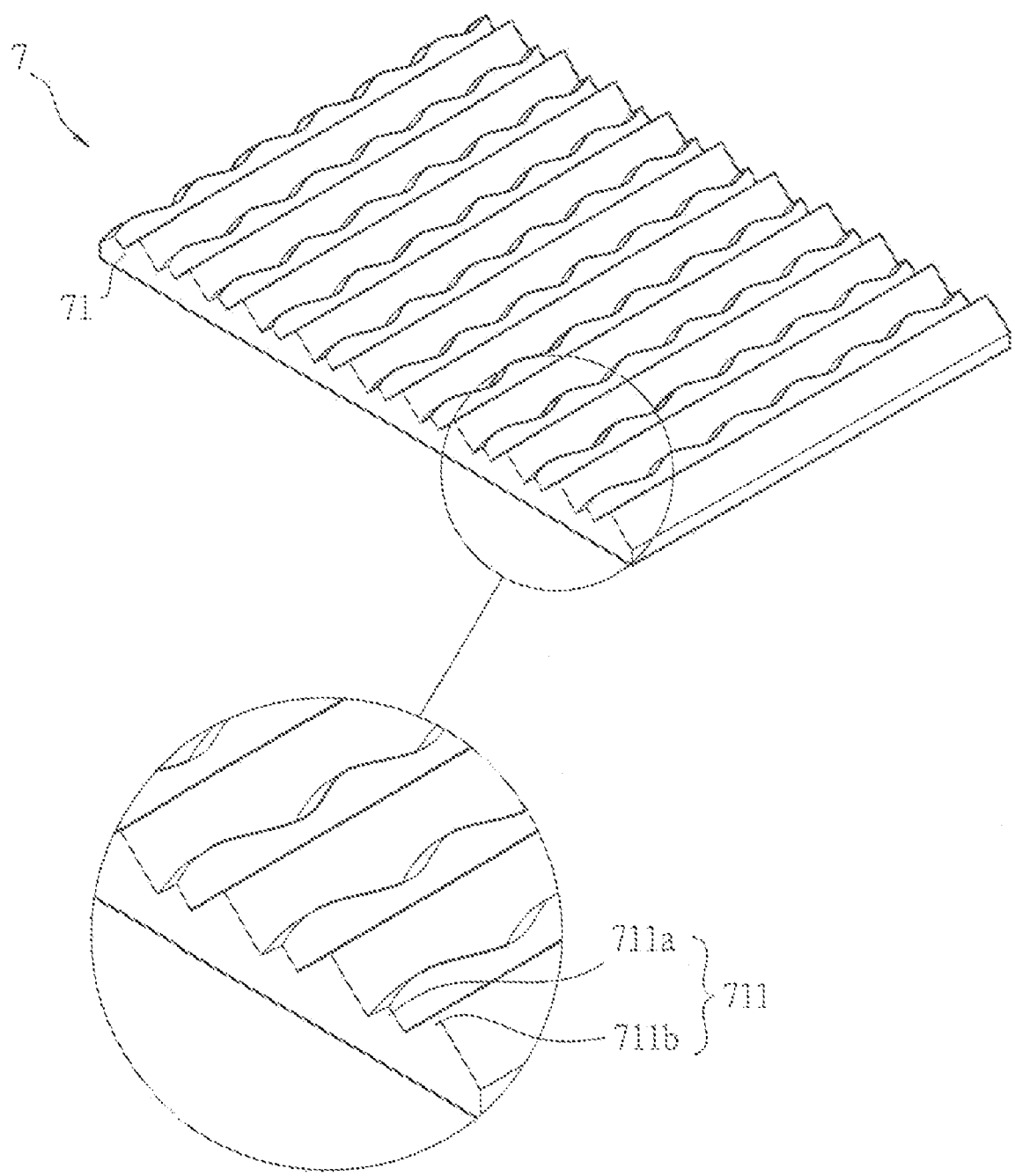
FIG. 6 shows a perspective view of an optic him constructed in accordance with a first embodiment of fee present invention.
Figure 7:
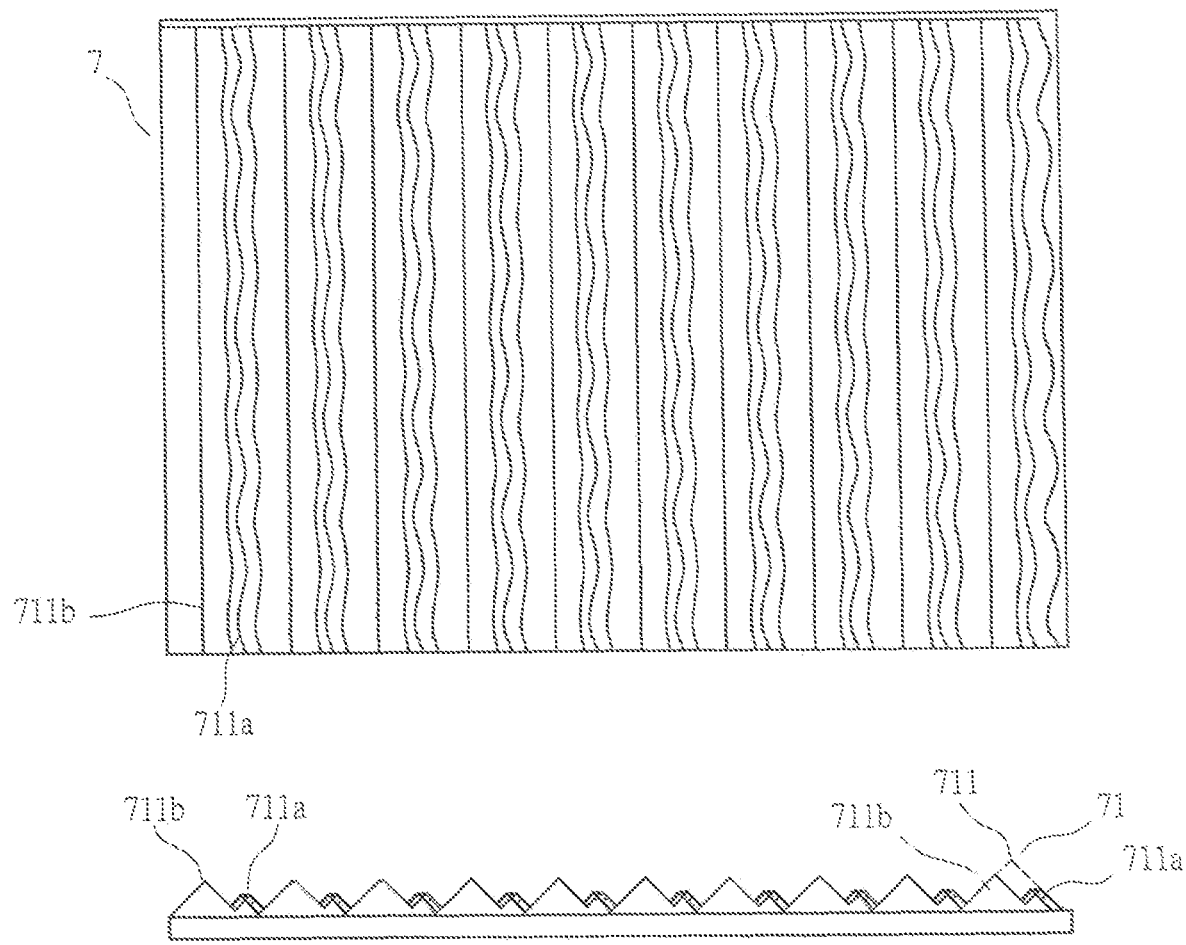
FIG. 7 shows a top plan view and an end view of the optic film of FIG. 6.
Figure 8:
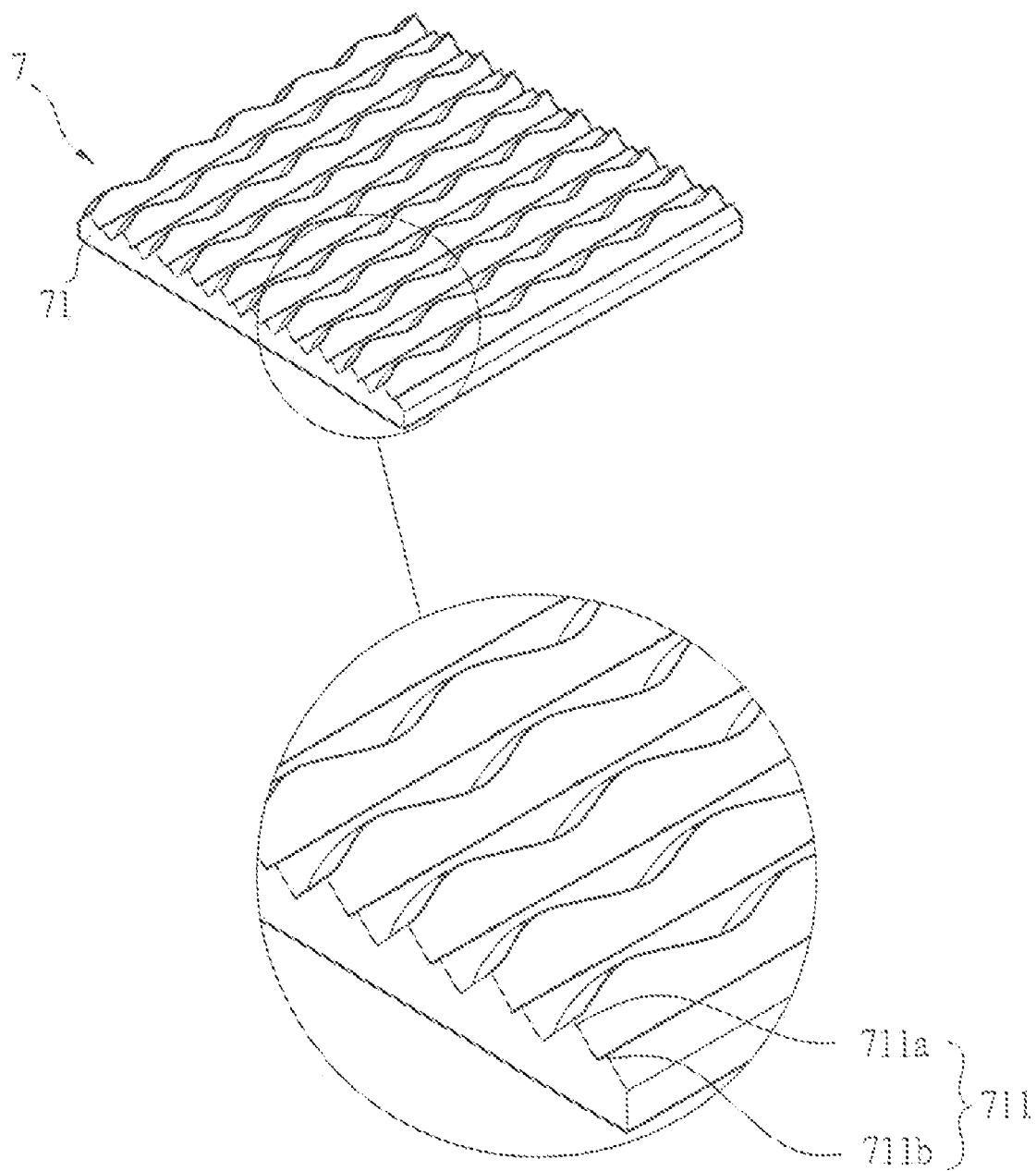
FIG. 8 shows a perspective view of an optic film constructed in accordance with a second embodiment of the present invention.
Figure 9:
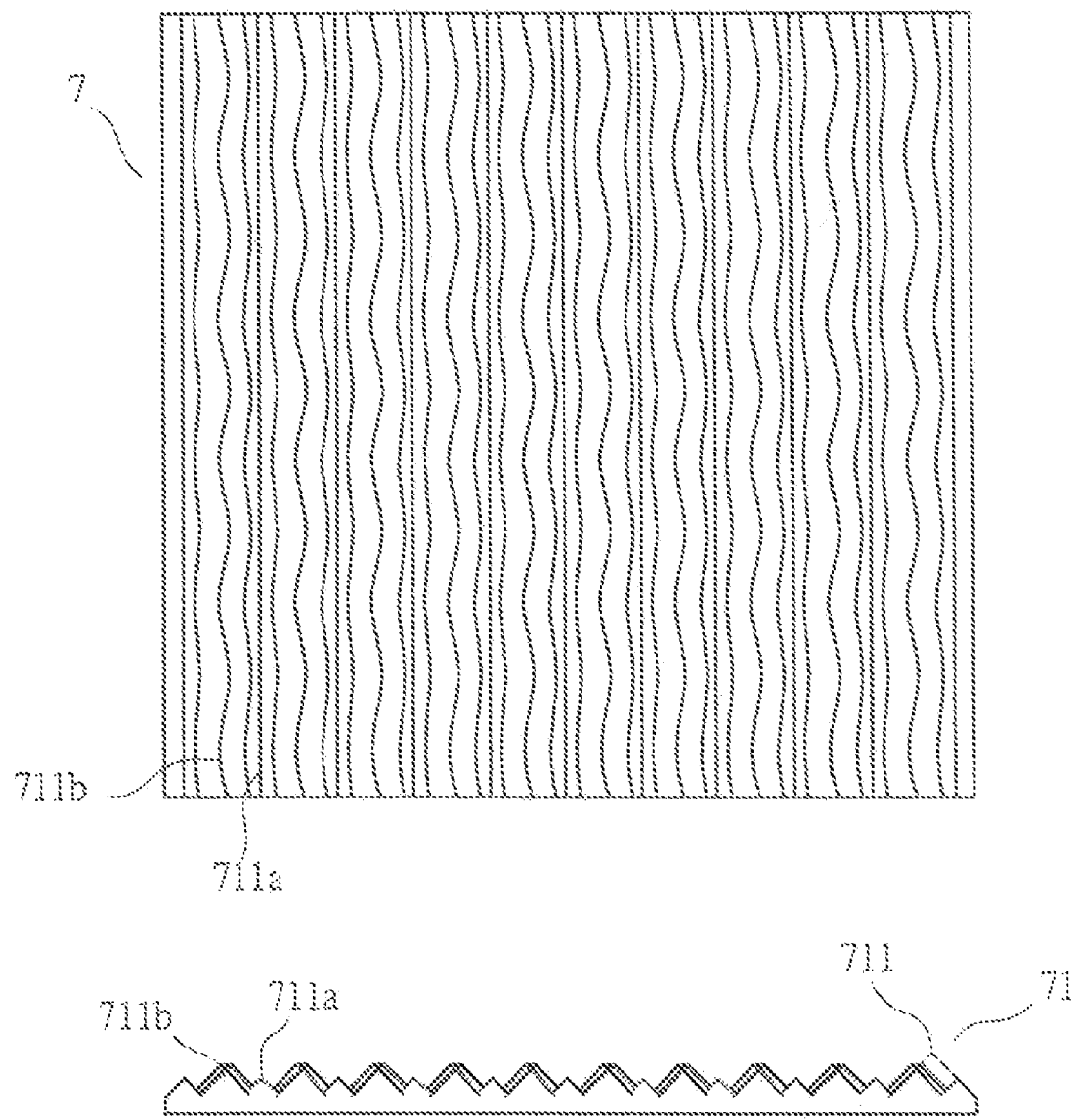
FIG. 9 shows a fop plan view and an end view of the optic film of FIG. 8.
Figure 10:
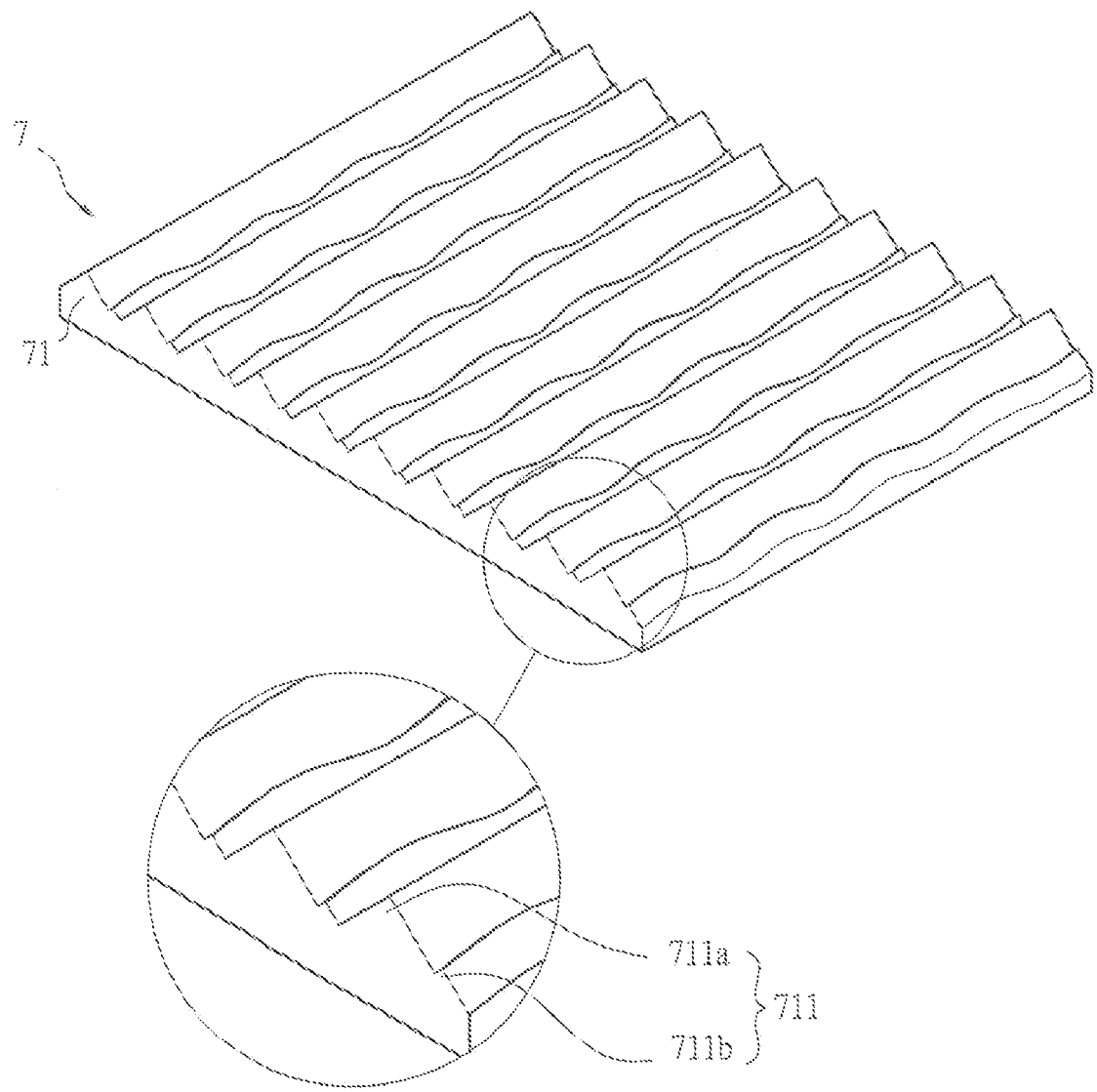
FIG. 10 snows a perspective view of an optic film constructed in accordance with a third embodiment of fee present invention.
Figure 11:
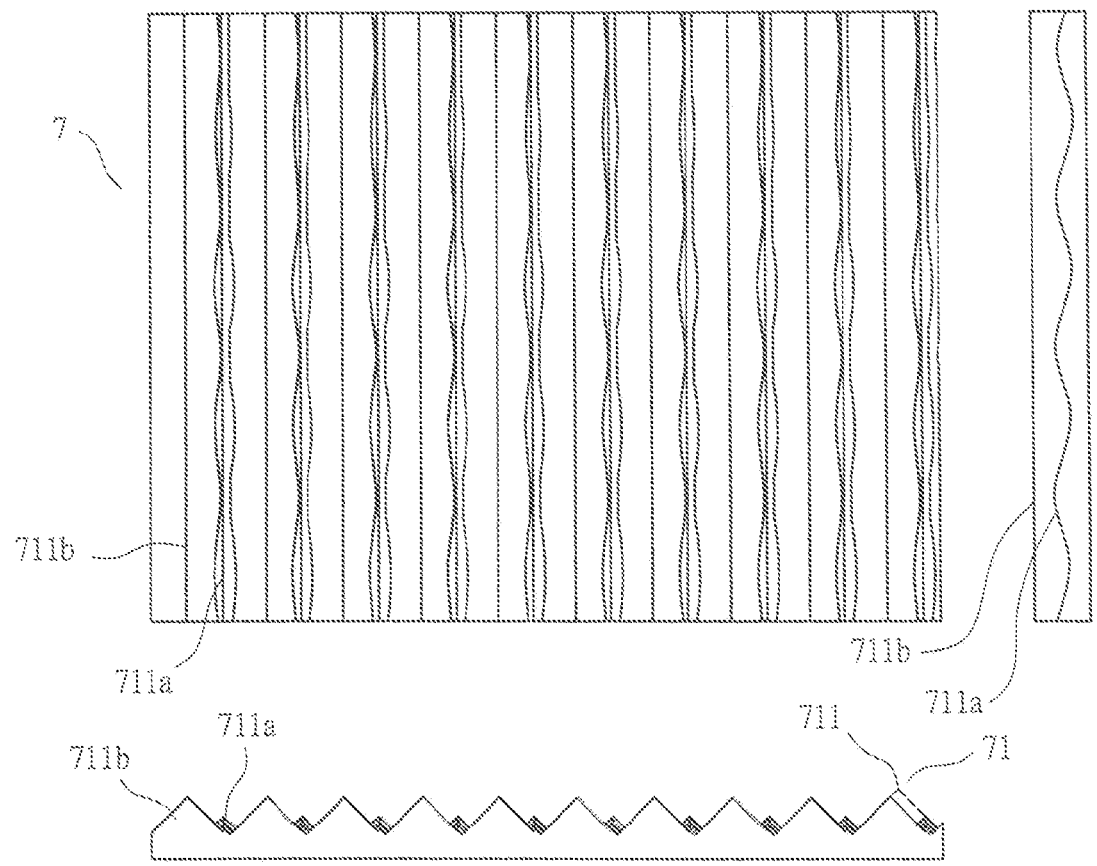
FIG. 11 shows a top plan view, an end view, and a side elevational view of the optic film of FIG. 10.
Figure 12:
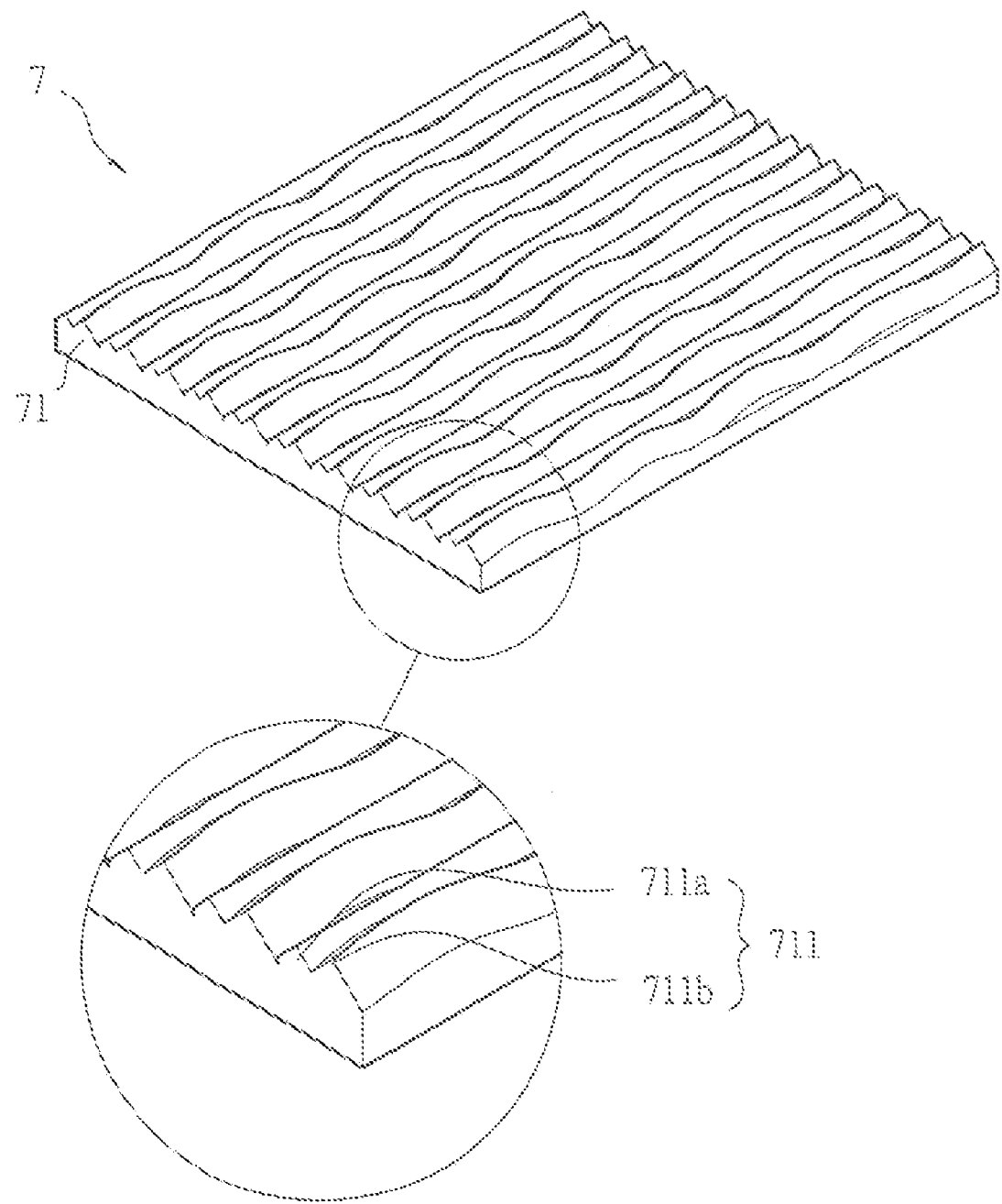
FIG. 12 shows a perspective view of an optic film constructed in accordance with a fourth, embodiment of the present invention.
Figure 13:
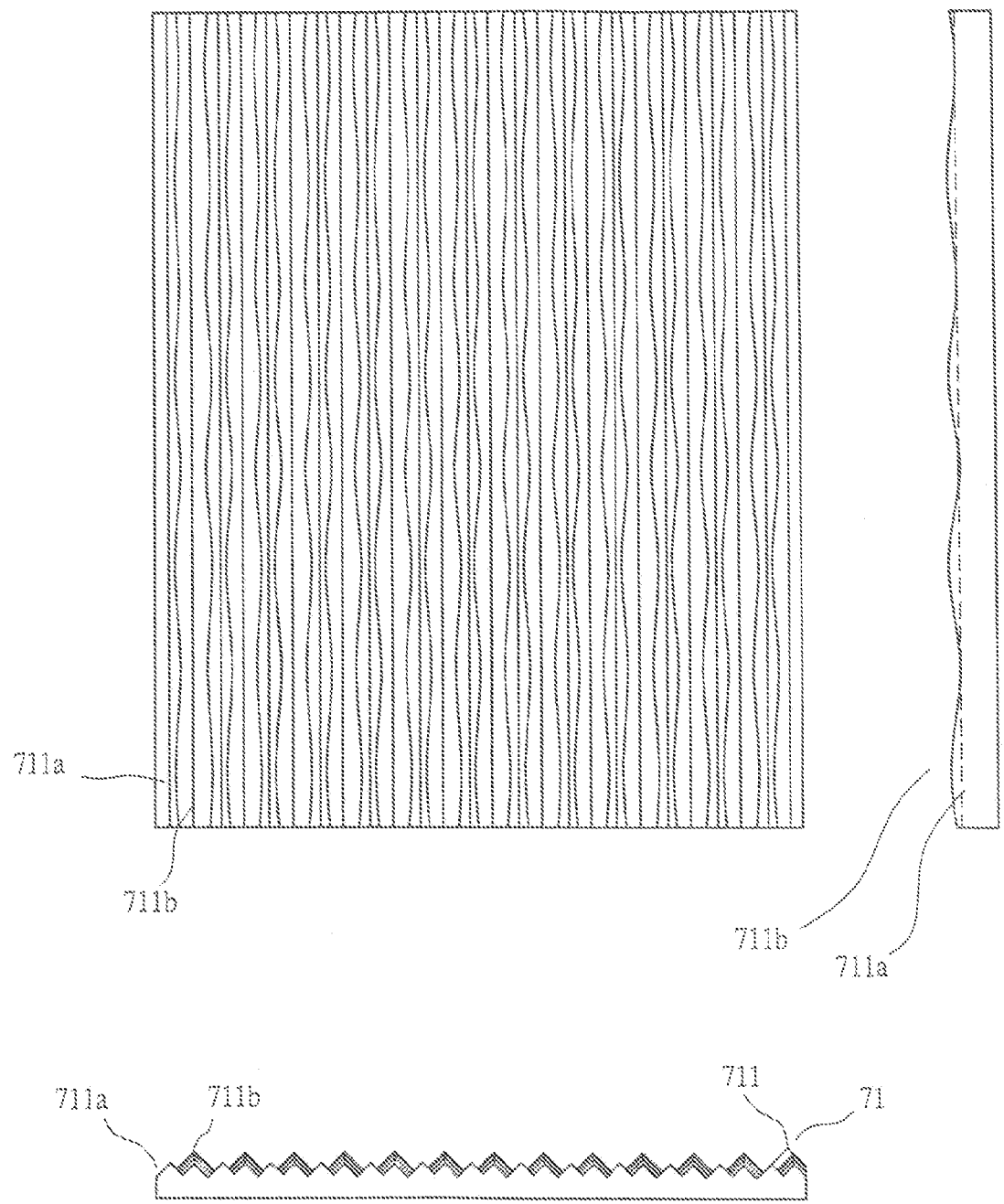
FIG. 13 shows a top plan view, an end view, and a side elevational view of the optic film of FIG. 12.
Figure 14:
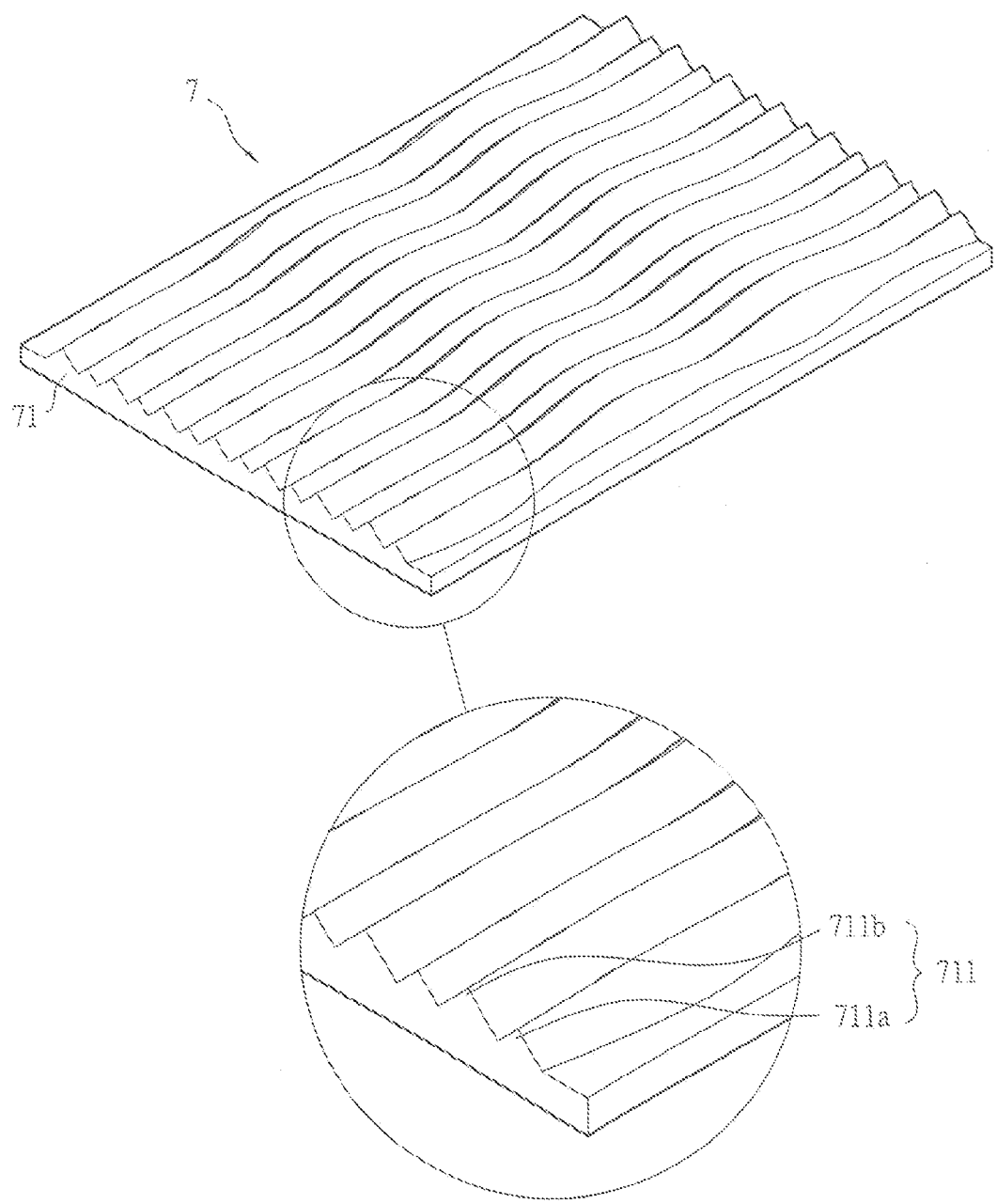
FIG. 14 shows a perspective view of an optic film, constructed hi accordance with a fifth embodiment of the present invention.
Figure 15:
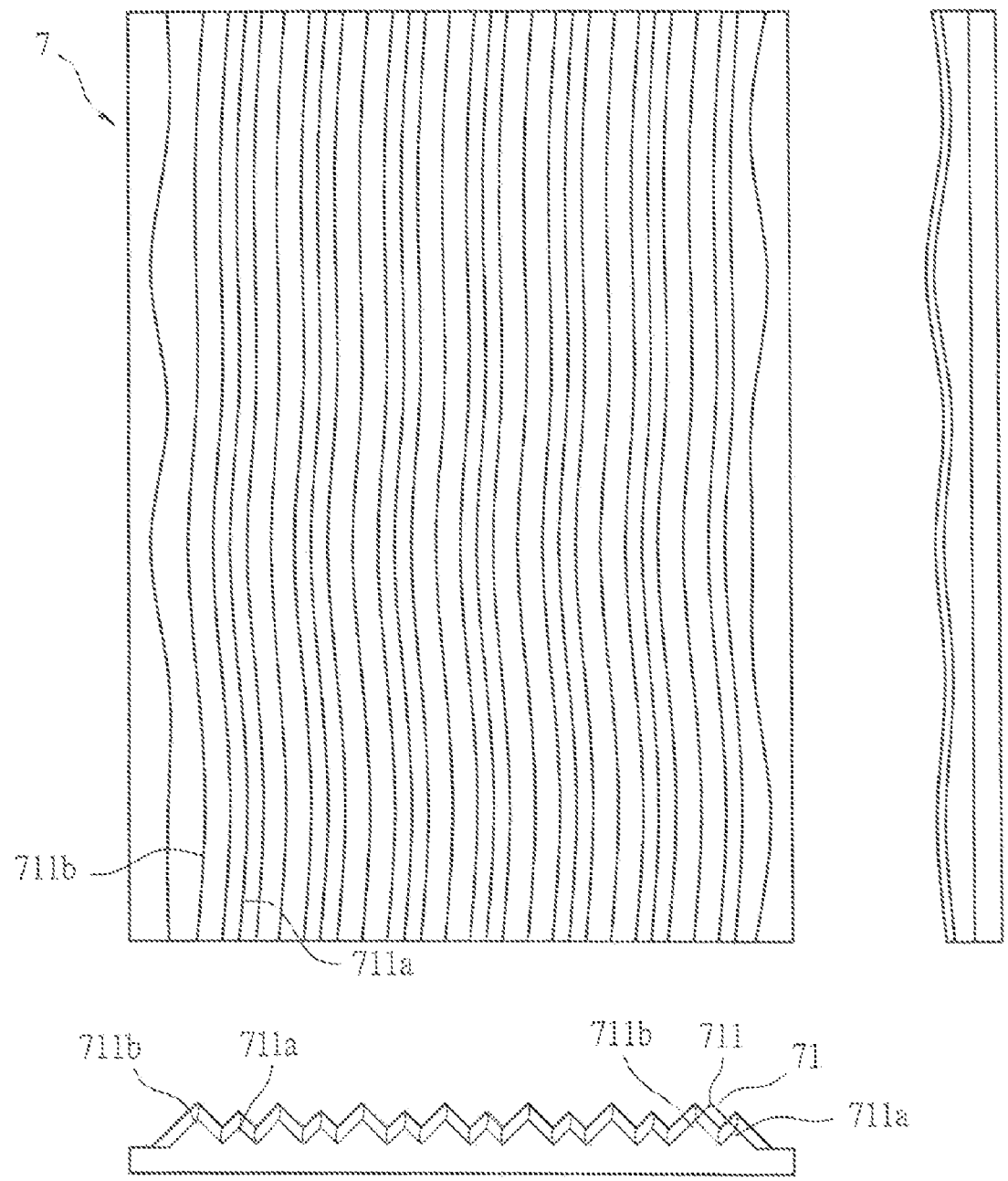
FIG. 15 shows a top plan view, an end view, and a side elevational view of the optic film of FIG. 14.
Figure 16:
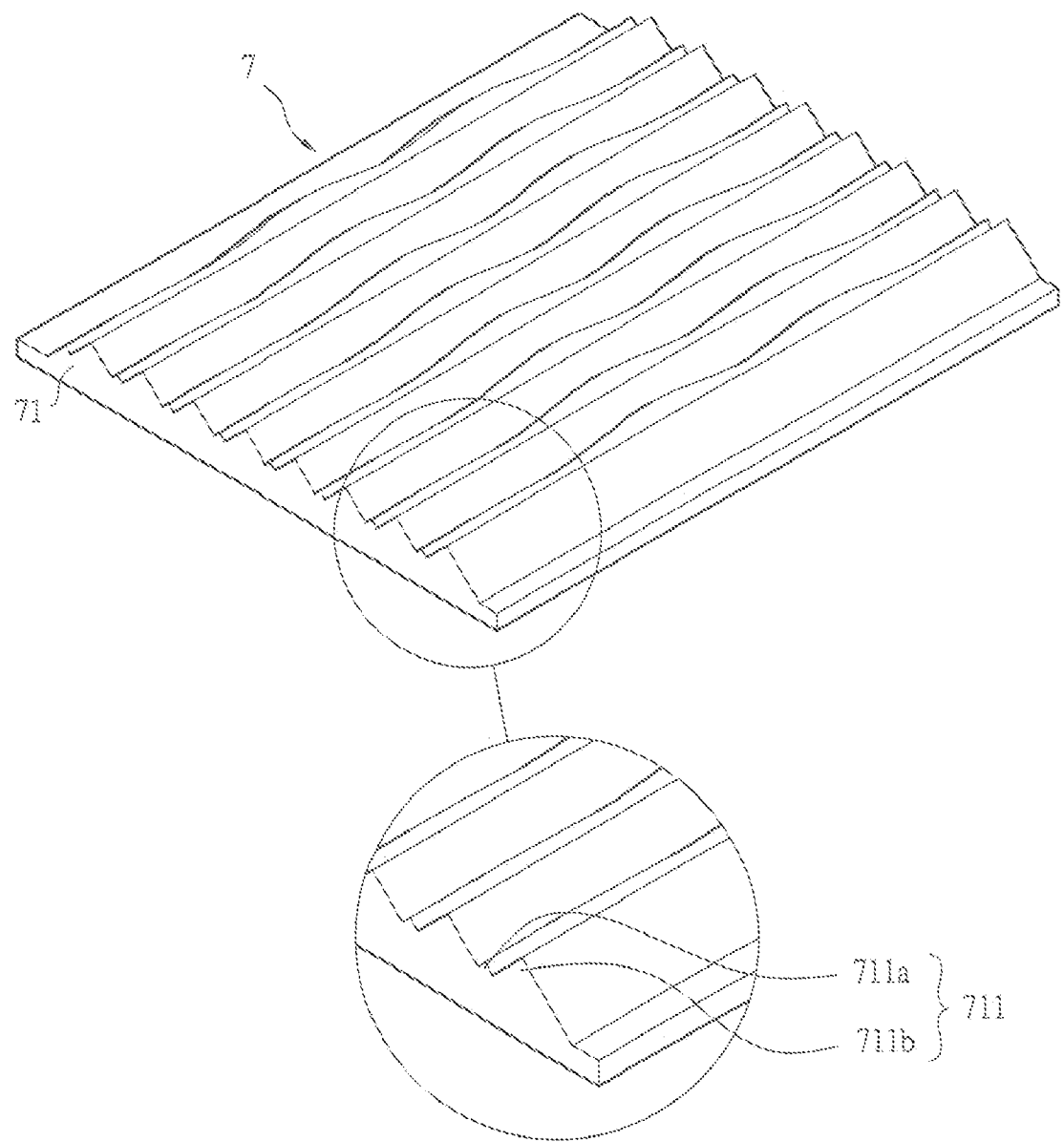
FIG. 16 shows a perspective view of an optic film, constructed in accordance with a sixth embodiment of the present invention.
Figure 17:
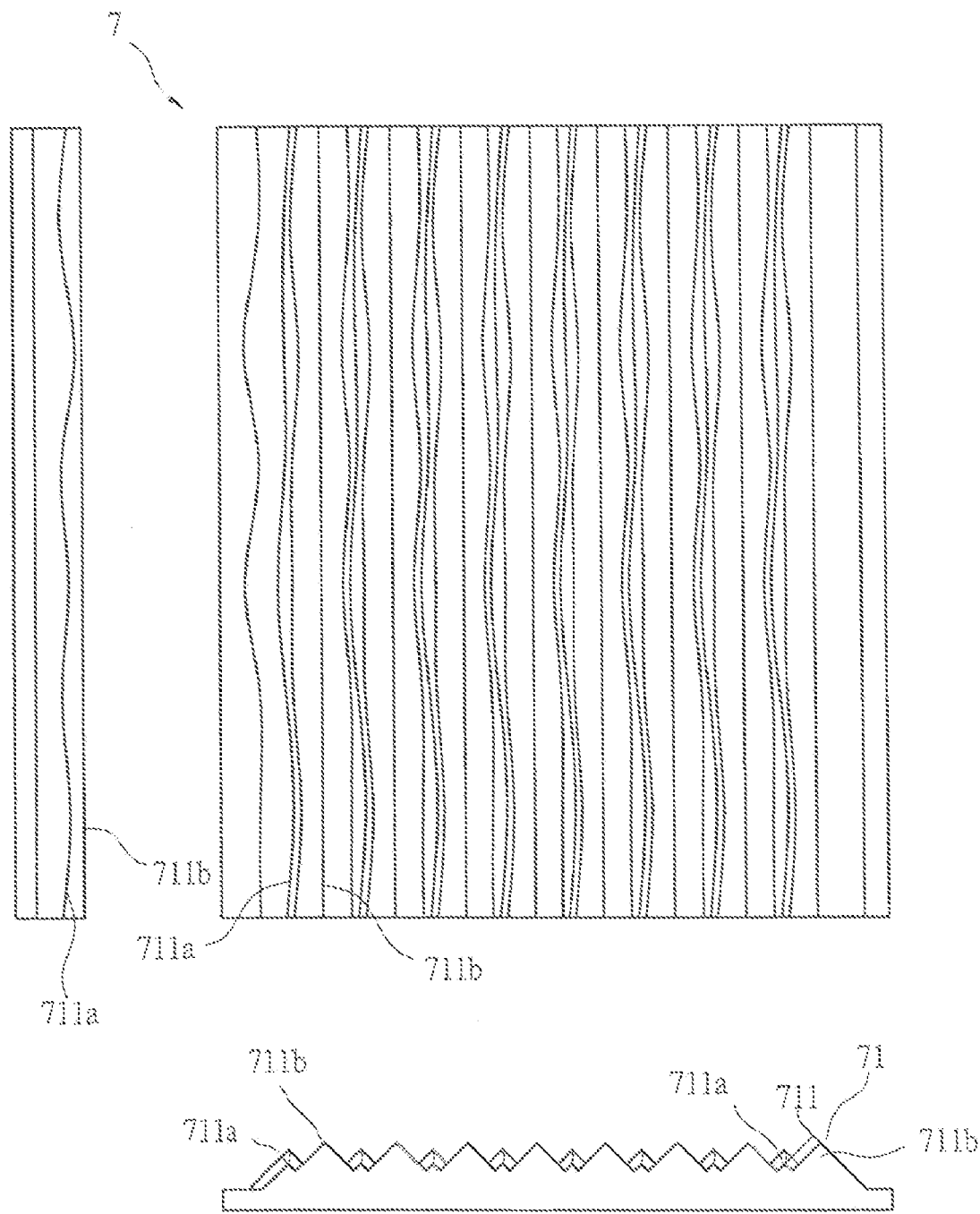
FIG. 17 shows a top plan view; an end view, and a side elevational view of the optic film of FIG. 16.

The light source L can be of any suitable light source, such as a cold cathode fluorescent lamp and a light-emitting diode. When fie light source L is embodied by a light-emitting diode, the longitudinal direction, of the light converging elements 531 of me light guide board S is arranged toward the light source L as shown in FIGS. 4 and 5. Further, the light converging elements 531 can be arranged in such a distribution that has dense at a location close to the light source L and that gets sparser with an increased distance from the light source L.

To embody the optic film 7 in accordance with the present invention, the ridges 711 of the micro light guide 71 are of different heights, and are thus divided into the low ridge 711b and the high ridge 711a. As shown in FIGS. 6-9, either the low ridge 711b or the high ridge 711a of the micro light guide 71 or both are of a continuous left-and-right wavy configuration. As such, when light transmits through the optic film 7, the continuous left-and-right wavy configuration of the low ridge 711b (or the high ridge 711a) causes the light that transmits through and is converged by the micro light guide 71 to leave the micro light guide 71 in a non-straight linear beam, and contains variations caused by curving. Thus, the light beam passing through the optic film 7 is not in a regular form, which prevents the light from inducing refraction when the light passes through thin-film transistors and color filters of a liquid crystal display panel whereby no interference pattern will occur in image displaying by the liquid crystal display panel.

Referring to FIGS. 10-13, in accordance with another embodiment of the present invention, the low ridge 711b or the high ridge 711a of the micro light guide 71 or both are made a continuous up-and-down height-variation configuration. As such, when light transmits through the optic film 7, the continuous up-and-down wavy configuration of the low ridge 711b or the high ridge 711a of the micro light guide 71 can similarly make the light beam that is converged by the light guide 7 irregular so that the light induces no interference pattern in a liquid crystal display panel when the light passes through thin-film transistors and color filters of the liquid crystal display panel.

Figure 18:
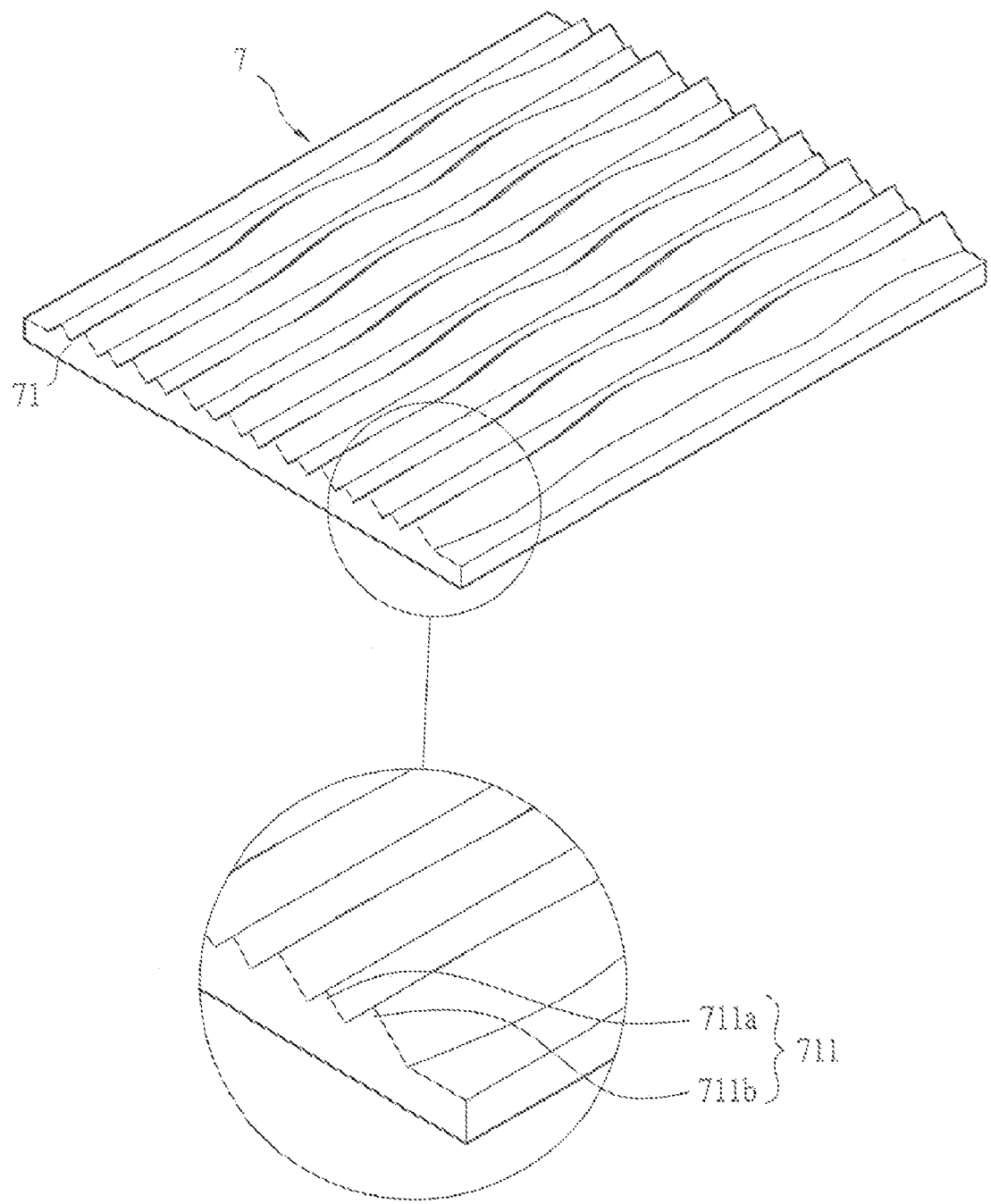
FIG. 18 shows a perspective view of an optic film constructed in accordance with a seventh embodiment of the present invention.
Figure 19:
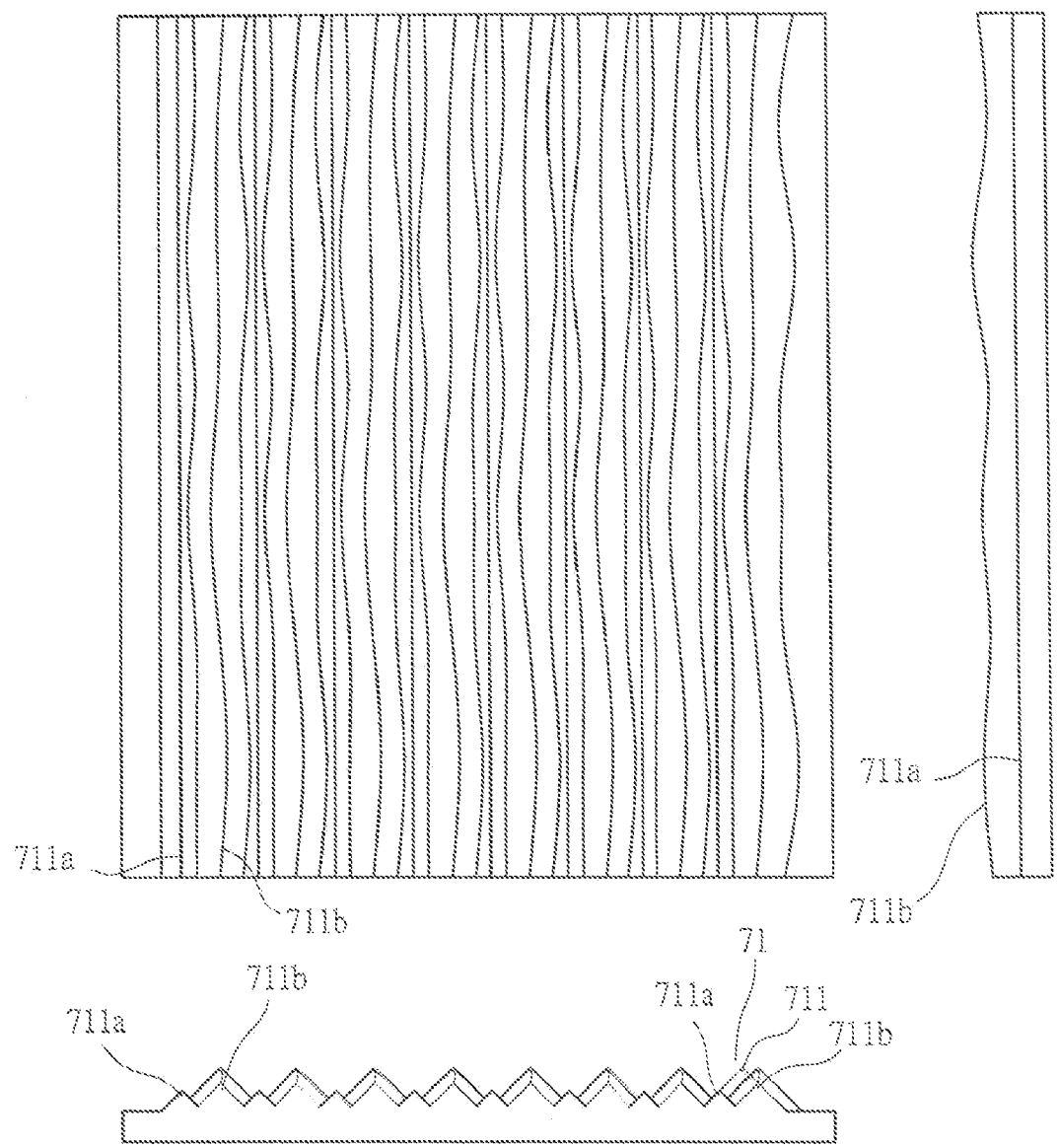
FIG. 19 shows a top plan view, an end view and a side elevational view of the optic film of FIG. 18.

Referring to FIGS. 14-17, in accordance with a further embodiment of the present invention, the low ridge 711b or the high ridge 711a of the micro light guide 71 is made both a left-and-right wavy configuration and a continuous up-and-down height-variation configuration, or alternatively as shown FIGS. 18 and 19, both the low ridge 711b and the high ridge 711a of the micro light guide 71 are made both a left-and-right wavy configuration and a continuous up-and-down height-variation configuration. As such, when light transmits through the optic film 7, the continuous up-and-down height-variation and left-and-right wavy configuration of the low ridge 711b or the high ridge 711a of the micro light guide 7 makes the light beam that is converged by the light guide 7 irregular so that the light induces no interference pattern in a liquid crystal display panel when the light passes through thin-film transistors and color filters of the liquid crystal display panel.

Figure 20:
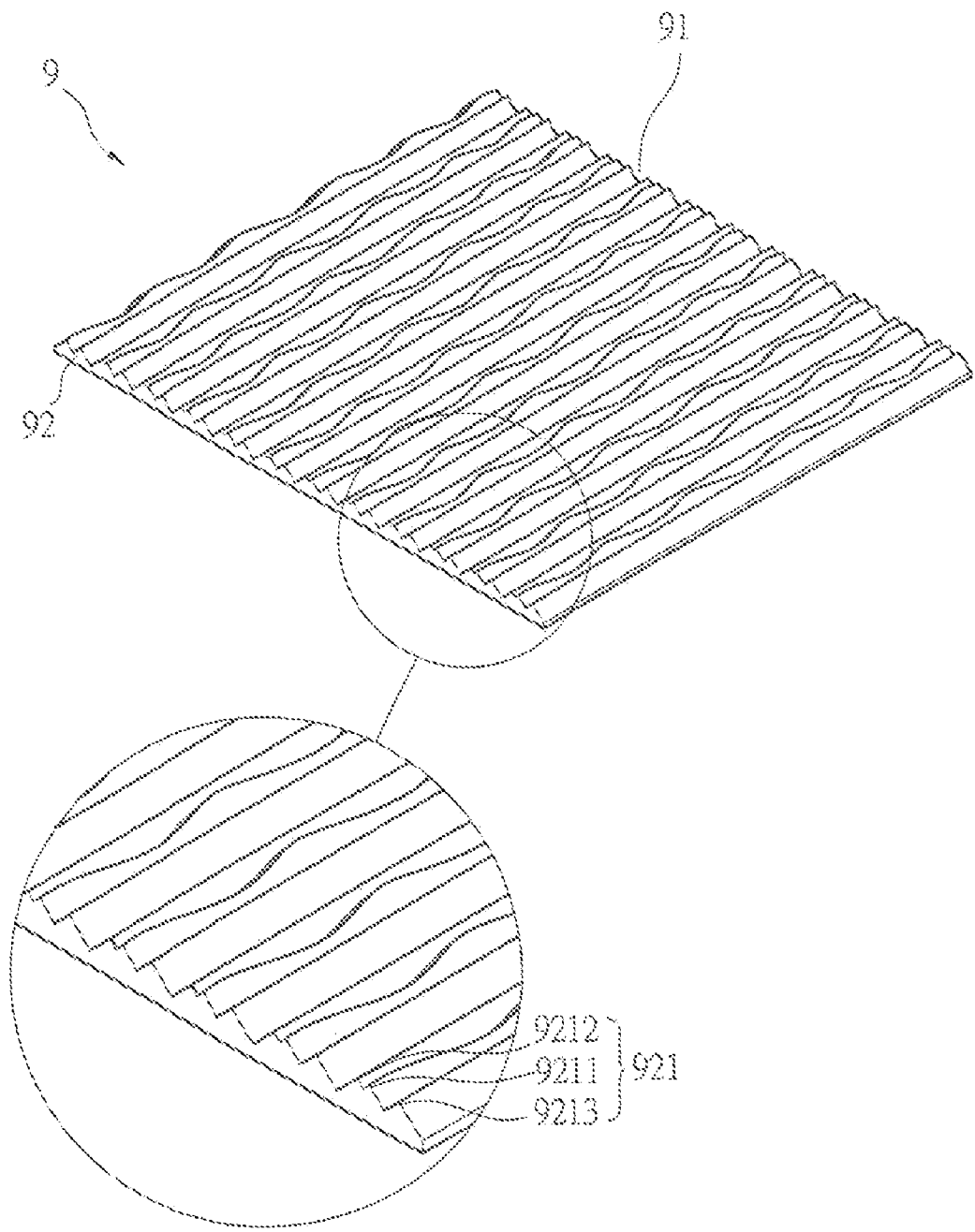
FIG. 20 shows a perspective view of an optic film constructed in accordance with an eighth embodiment of the present invention.
Figure 21:
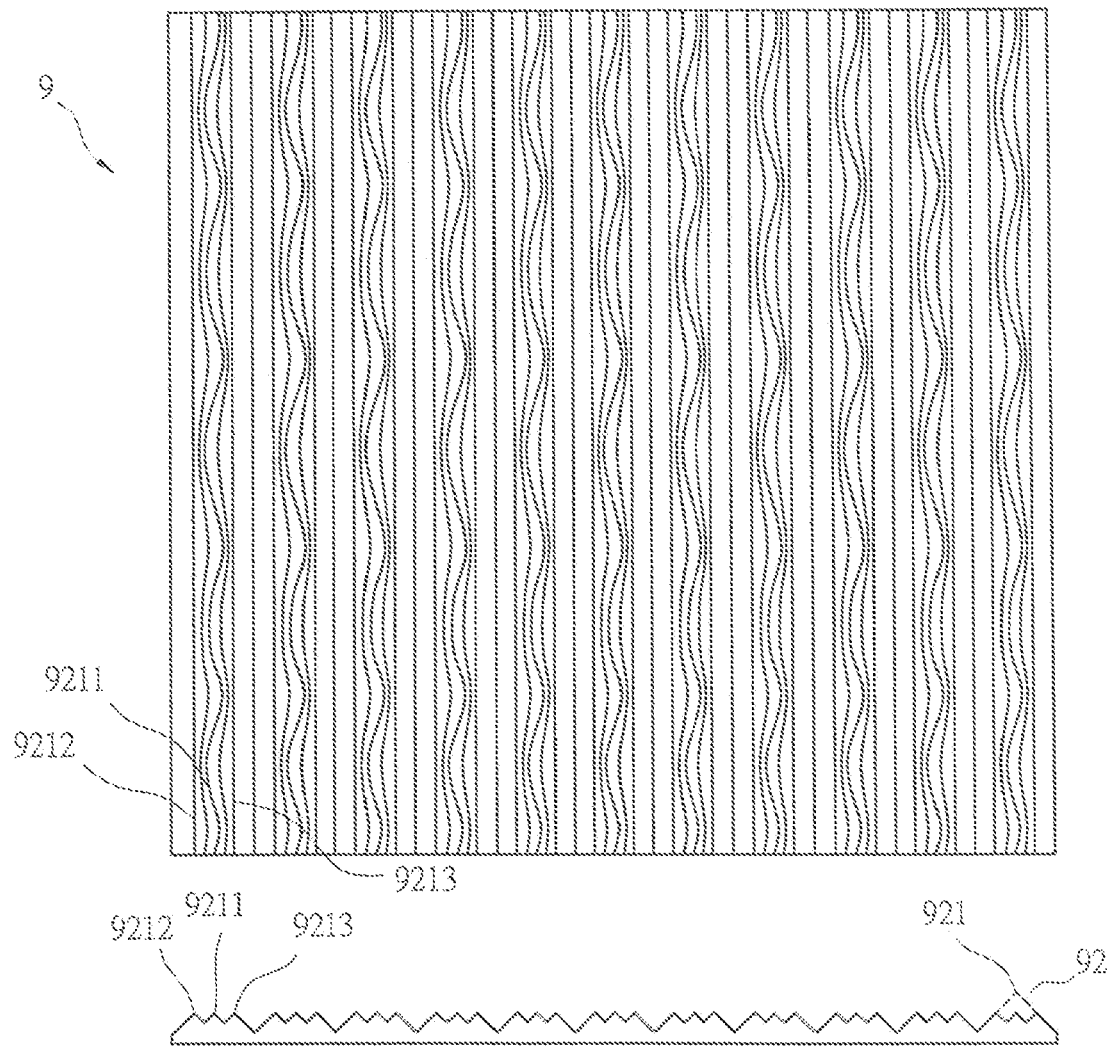
FIG. 21 shows a top plan view and an end view of the optic film of FIG. 20.

Referring to FIGS. 20 and 21, in accordance with a further embodiment of the present invention, an optic film 9 has a surface 91 on which a plurality of rib-like micro light guides 92 is formed Each micro light guide 92 comprises at least two ridges 921, of which the number is taken as three for illustration of the present embodiment. All the ridges 921 of the micro light guides 92 are of substantially identical height and all or some of the ridges 921 of the micro light guides 92 have a variable configuration, wherein for example, a central ridge 9211 of die micro light guides 92 has a left-and-right wavy configuration, while two side ridges 9212,9213 are of straight linear configuration. As such, when light transmits through the optic film 9, the continuous left-and-right wavy configuration of the central ridge 9211 of the micro light guide 92 makes the light beam that Is converged by the micro light guide 92 irregular so mat die light induces no interference pattern in a liquid crystal display panel when the light passes tough thin-film transistors and color filters of the liquid crystal display panel.

Figure 22:
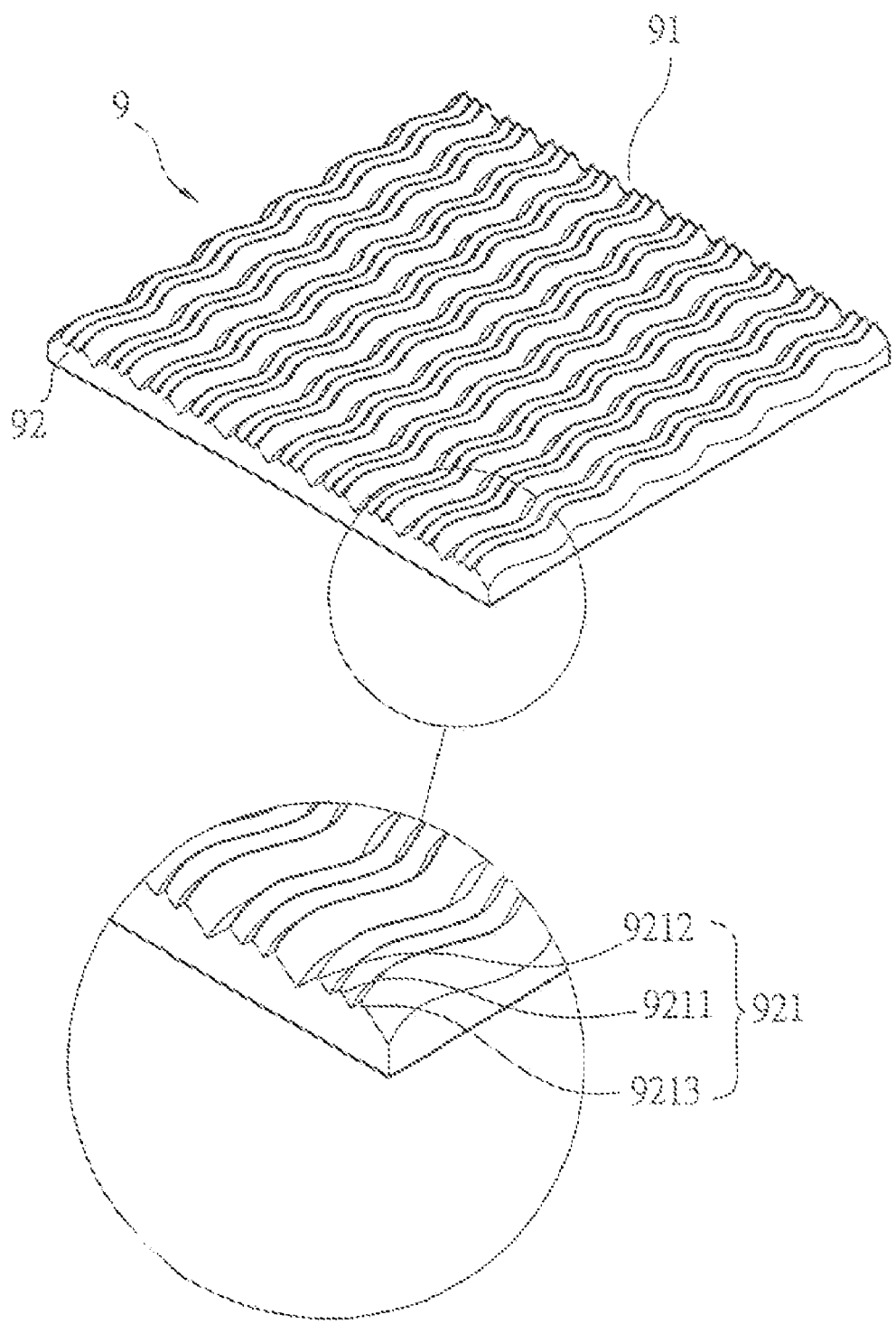
FIG. 22 shows a perspective view of an optic film constructed hi accordance with a ninth embodiment of the present invention.
Figure 23:
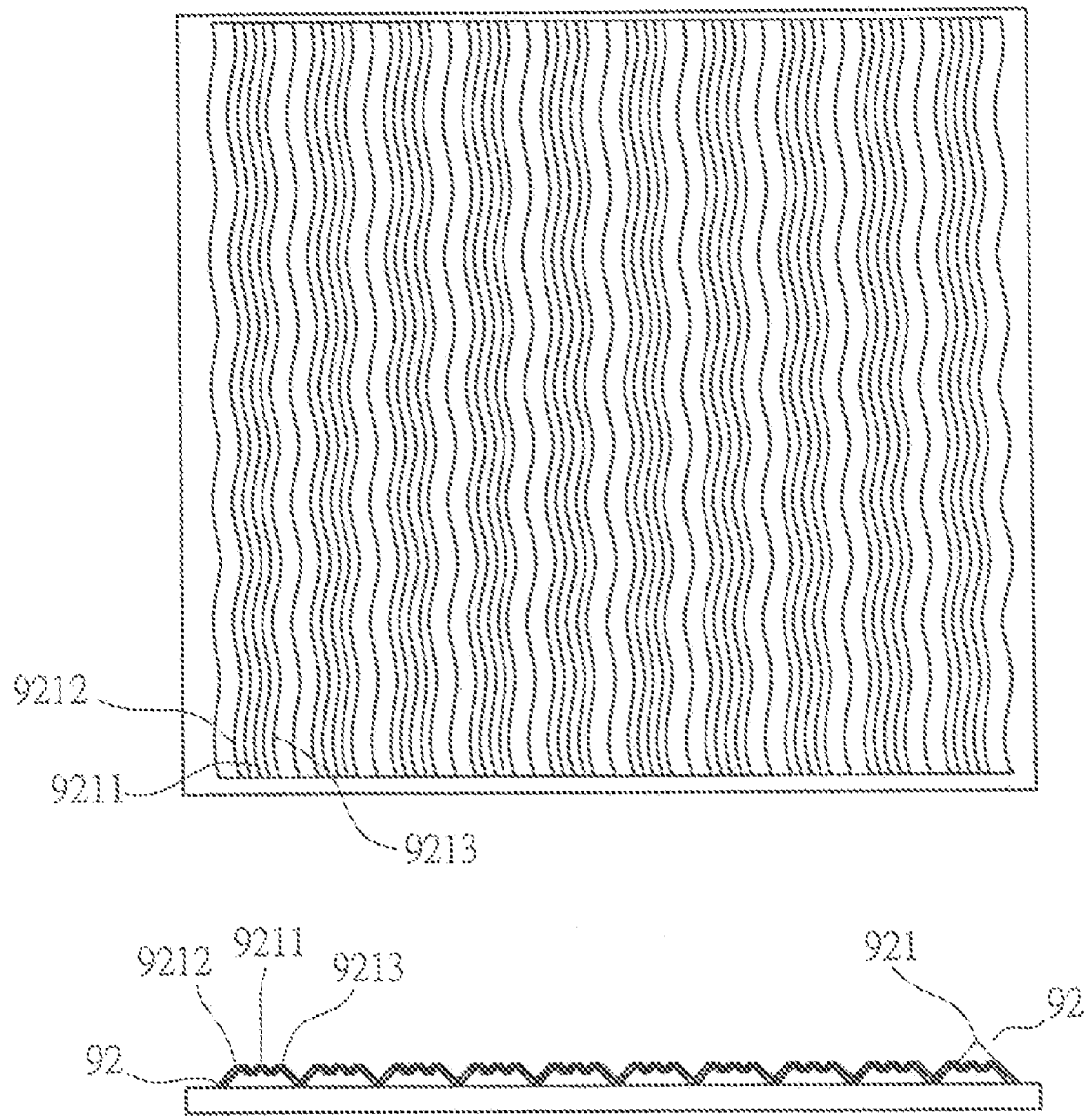
FIG. 23 shows a top plan view and an end view of the optic film of FIG. 22.

Referring to FIGS. 22 and 23, in accordance wife a further embodiment of the present invention, all the ridges 9211, 9212,9213 of each micro light guide 92 of die optic film 9 are made a continuous left and right wavy configuration. As such, light transmitting through die optic film 9 can be of variations, so that the light induces no interference pattern, in a liquid crystal display panel when die light: passes through thin-film transistors and color filters of the liquid crystal display panel.

Figure 24:
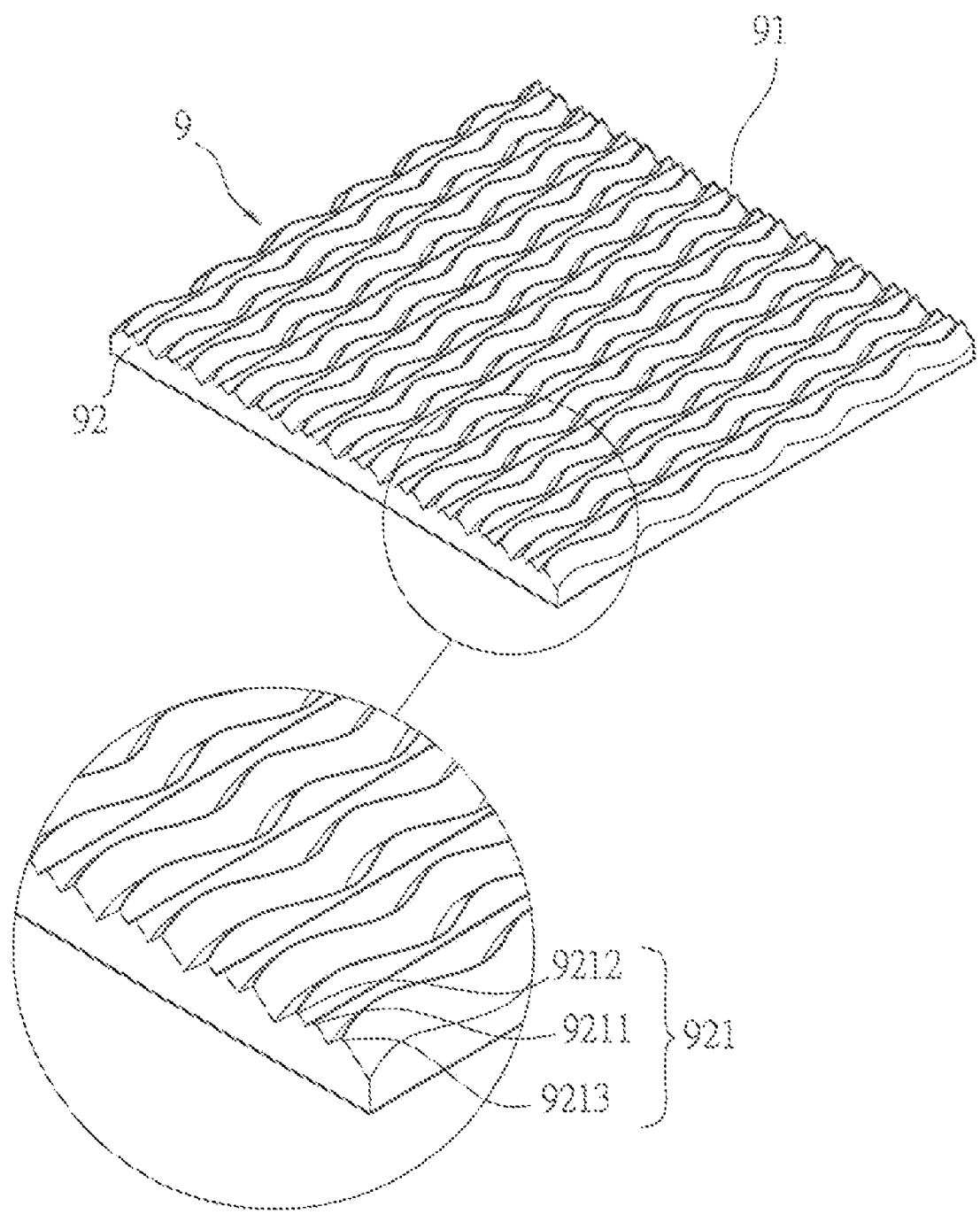
FIG. 24 shows a perspective view of an optic film constructed in accordance with a tenth embodiment of the present Invention.
Figure 25:
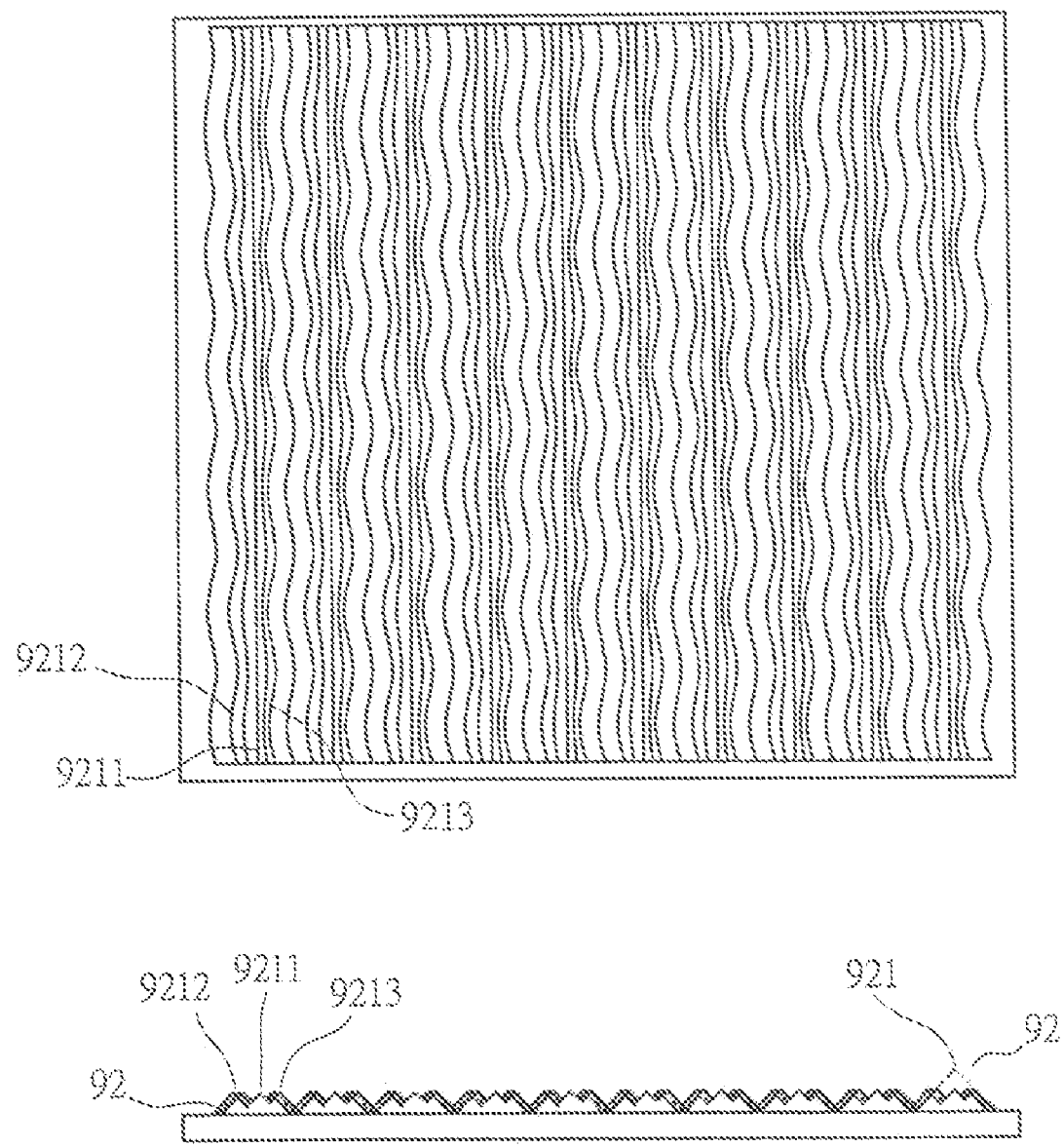
FIG. 25 shows a top plan view and an end view of the optic film of FIG. 24.

Referring to FIGS. 24 and 25, to embody die optic film 9 in accordance with a further embodiment of the present, invention, two side ridges 9212, 9213 of the micro light guide 92, which are located on opposite sides of a central ridge 9211, are made a continuous left-and-right wavy configuration, while the central ridge 9211 is made a straight linear configuration. As such, light transmitting through the micro light guide 92 can he of variations, so that the light induces no interference pattern in a liquid crystal display panel when the light passes through thin-film transistors and color filters of the liquid crystal display panel.

Figure 26:
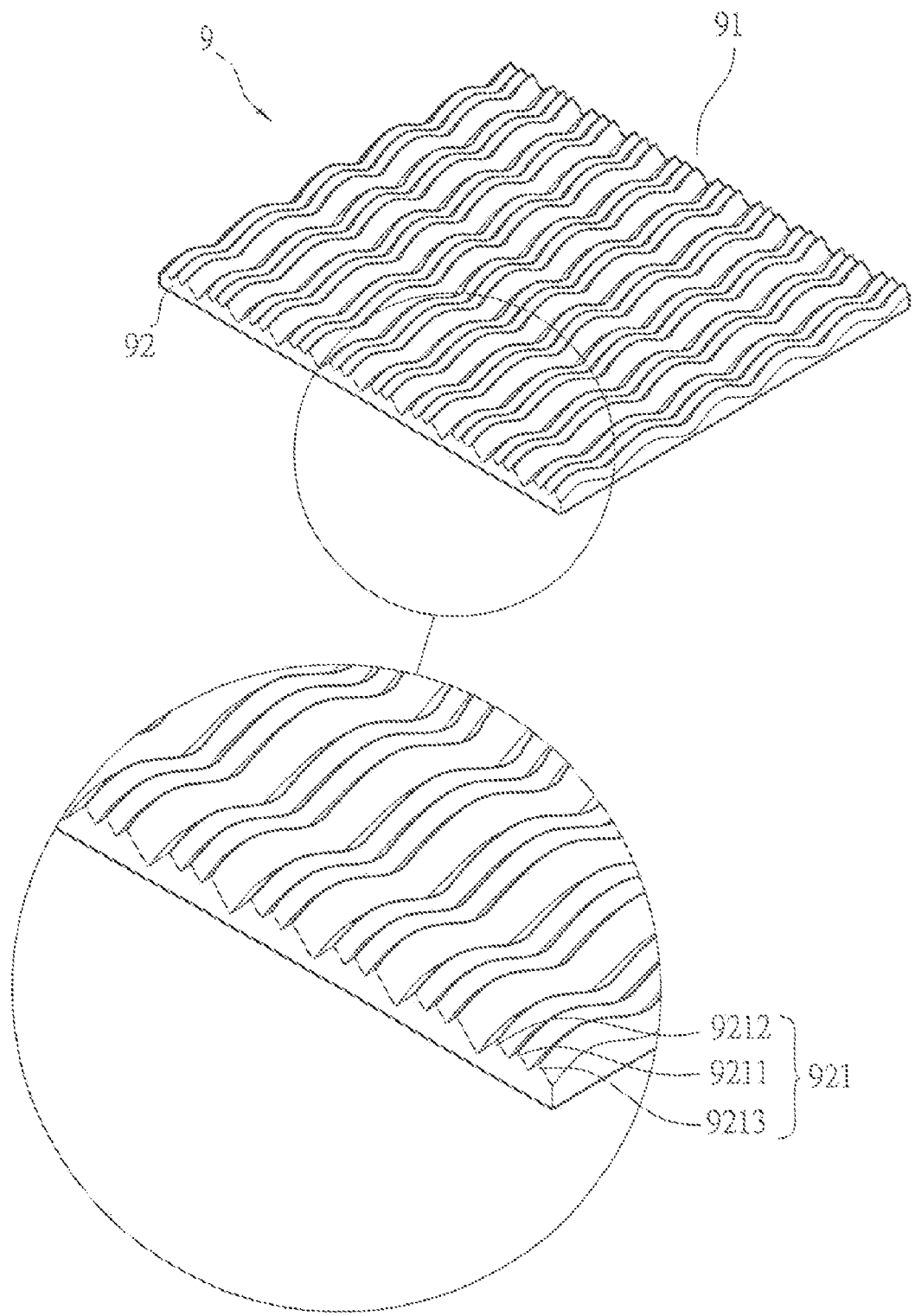
FIG. 26 shows a perspective view of an optic film constructed in accordance with an eleventh, embodiment of the present invention.
Figure 27:
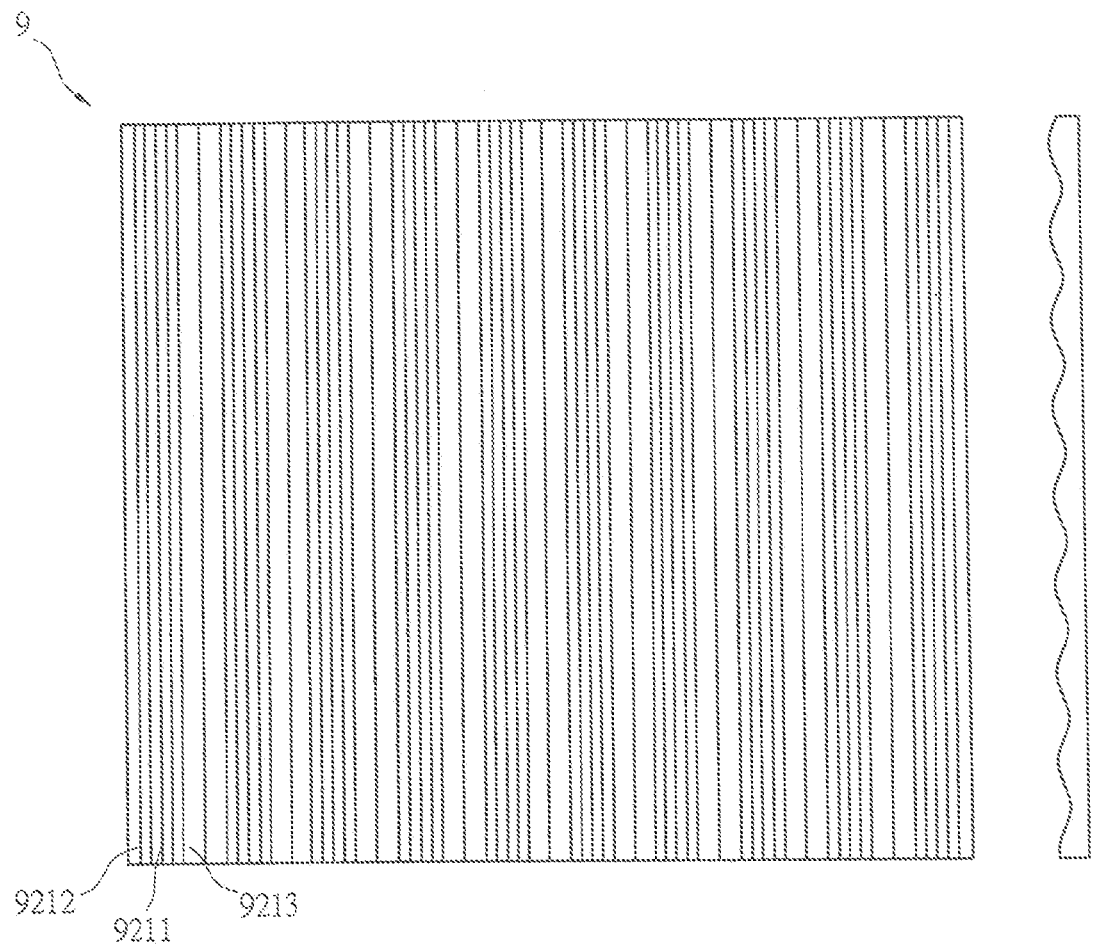
FIG. 27 shows a top plan view and a side elevational view of the optic film of FIG. 26.

Referring to FIGS. 26 and 27, to embody the optic film 9 in accordance with a further embodiment of the present invention, the ridge 9211,9212, 9213 of each micro light guide 92 are all made a continuous up-and-down height-variation configuration. As such, light transmitting through the optic film 9 can he of variations caused by the continuous up-and-down variation of heights of die ridges 9211,9212,9213 of die micro light guide 92, so that the light induces no interference pattern in a liquid crystal display panel when the light passes through thin-film transistors and color filters of the liquid crystal display panel.

Figure 28:
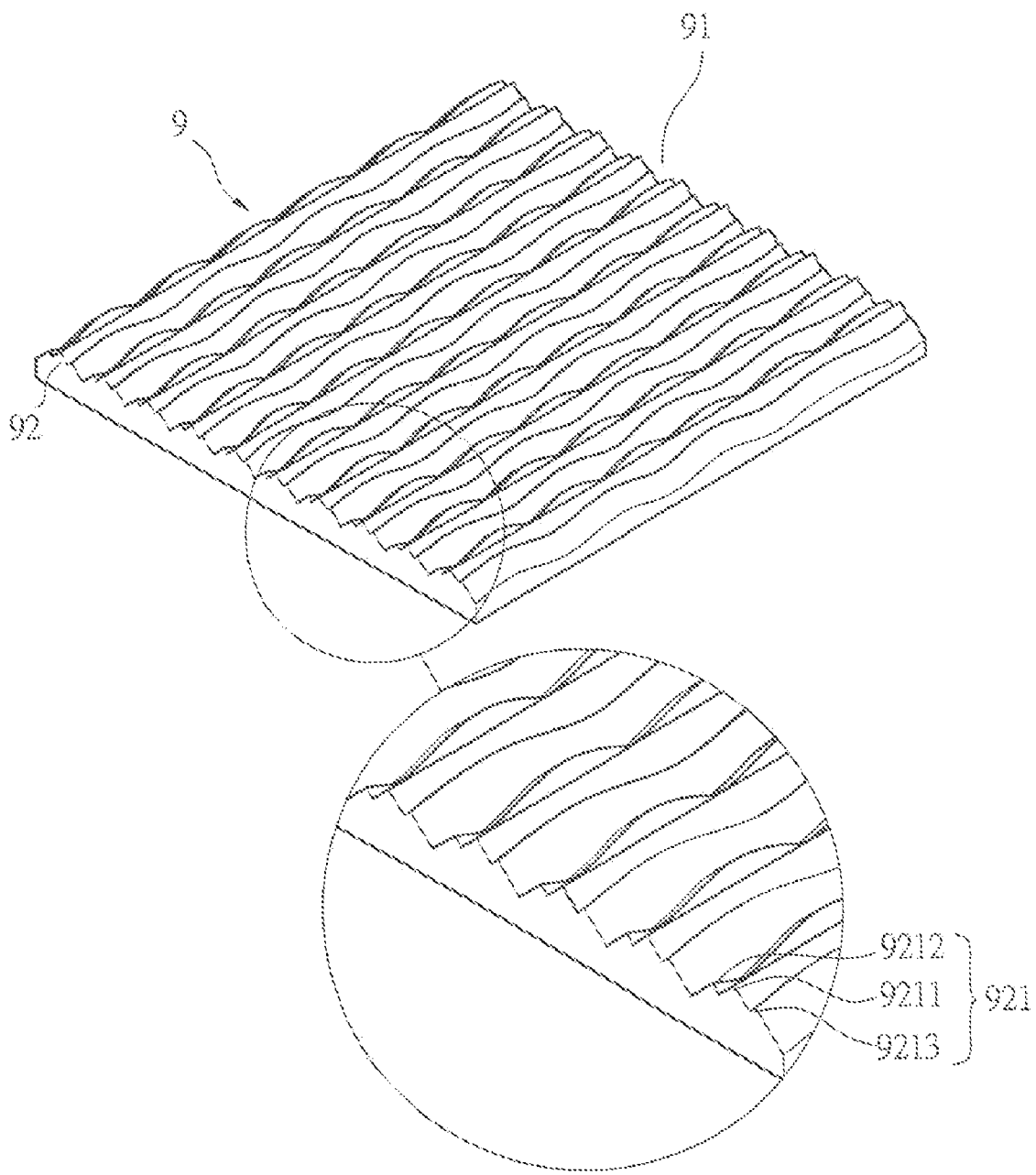
FIG. 28 shows a perspective view of an optic film constructed in accordance with a twelfth embodiment of the present invention.
Figure 29:
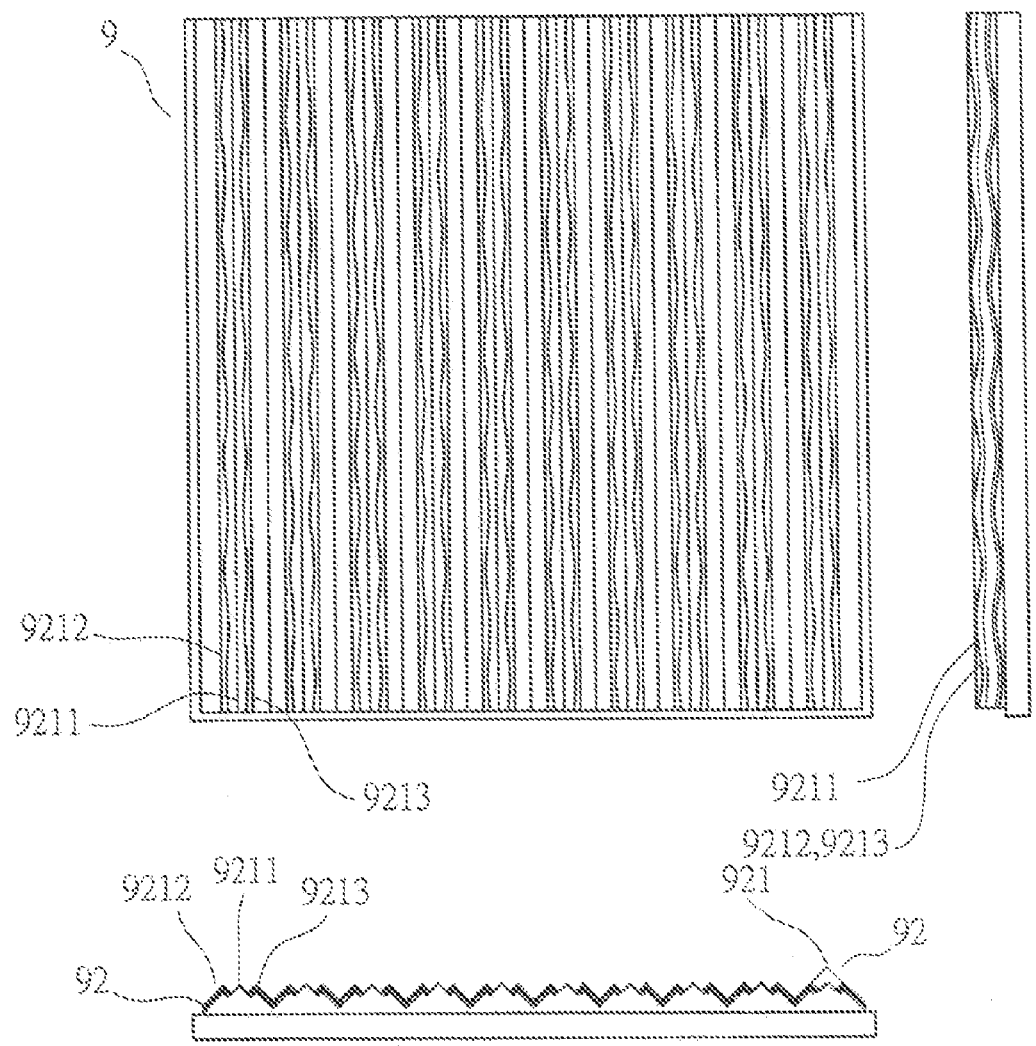
FIG. 29 shows a top plan view, an end view, and a side elevational view of the optic film of FIG. 28.

Referring to FIGS. 28 and. 29, to embody die optic film 9 in accordance with a further embodiment of the present invention, two side ridges 9212, 9213 of die micro light guide 92, which are located on opposite sides of a central ridge 9211, are made a continuous up-and-down height-variation configuration, while fee central ridge 9211 is of a fixed height. As such, light transmitting through the optic film. 9 can be of variations caused by the continuous up-and-down, variation of heights of fee side ridges 9212,9213 of the micro light guide 92, so that the light induces no interference pattern In a liquid crystal display panel when die light passes through thin-film transistors and color filters of die liquid, crystal display panel.

Figure 30:
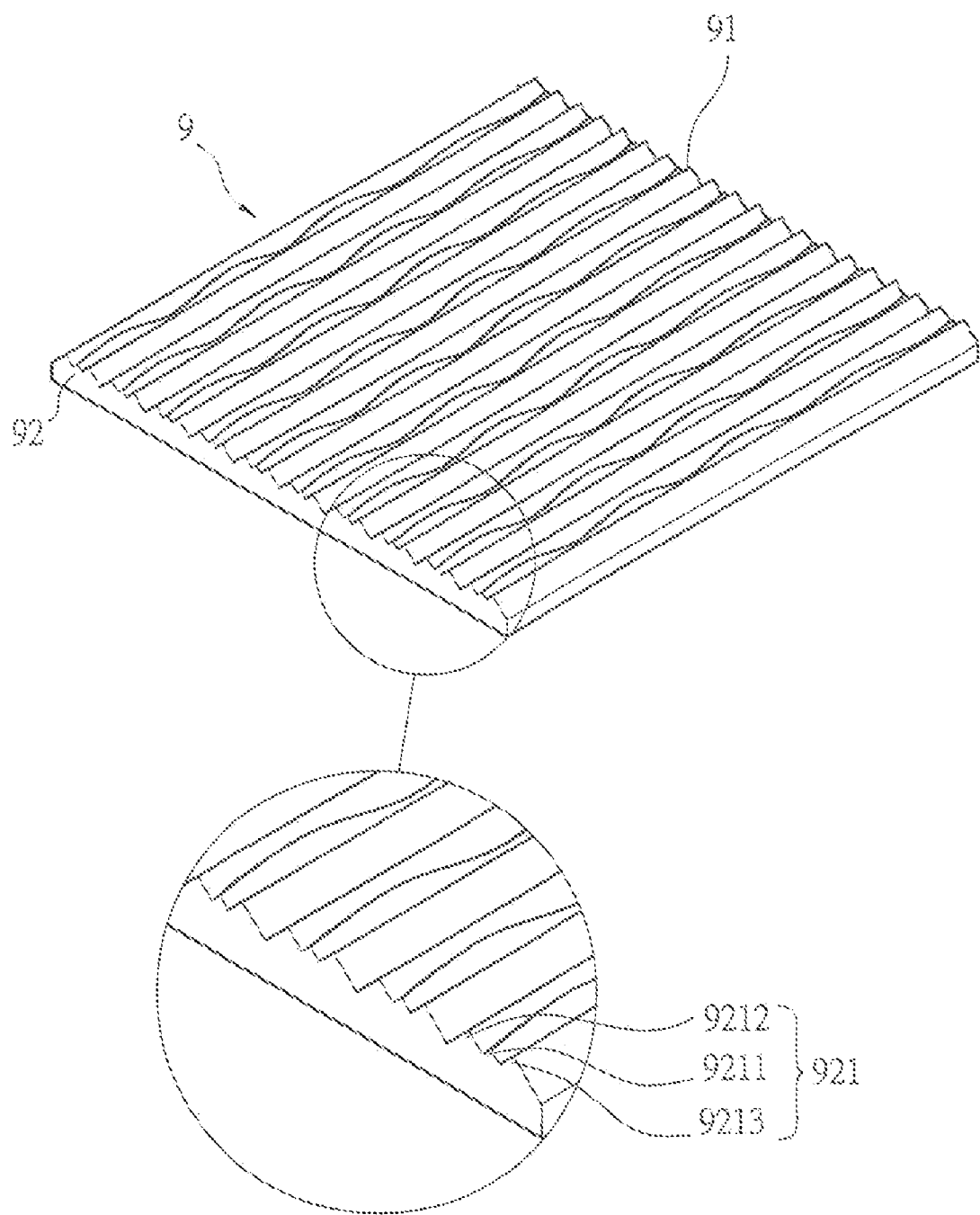
FIG. 30 shows a perspective view of an optic film constructed in accordance with a thirteenth embodiment: of the present invention.
Figure 31:
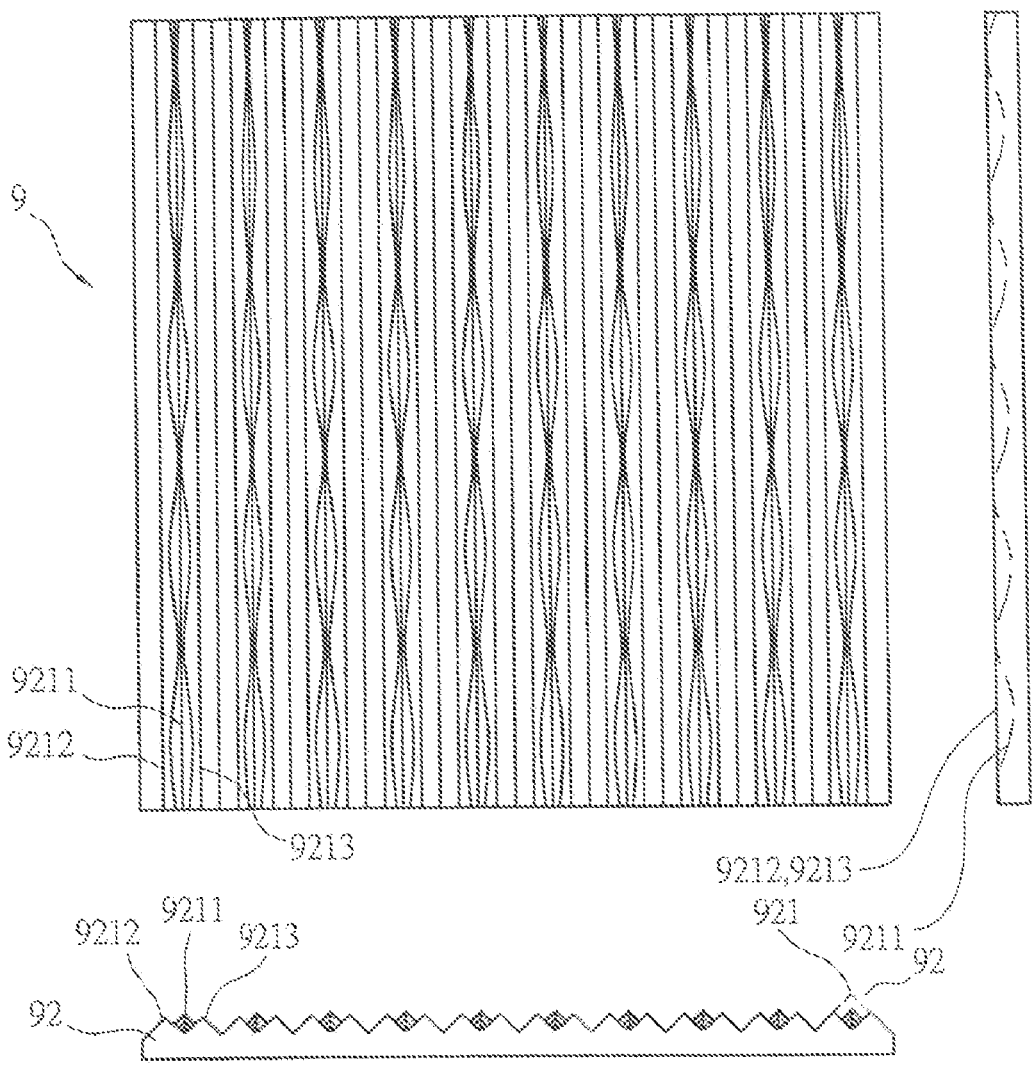
FIG. 31 shows a top plan view, an end view, and a side elevational view of the optic film of FIG. 30.

Referring to FIGS. 30 and 31 to embody the optic film 9 in accordance with a further embodiment of me present invention, a central ridge 9211 of the micro light guide 92 is made a continuous up-and-down height-variation configuration, while side ridges 9212,9213, which are located on opposite sides of the central ridge 3211, are of fixed heights. As such, light transmitting through the optic film 9 can be of variations caused by the continuous up-and-down variation of height of the central ridges 9211 of the micro light guide 92, so die light induces no interference pattern in a liquid crystal display panel when the light passes through thin-film transistors and color filters of the liquid crystal display panel.

Figure 32:
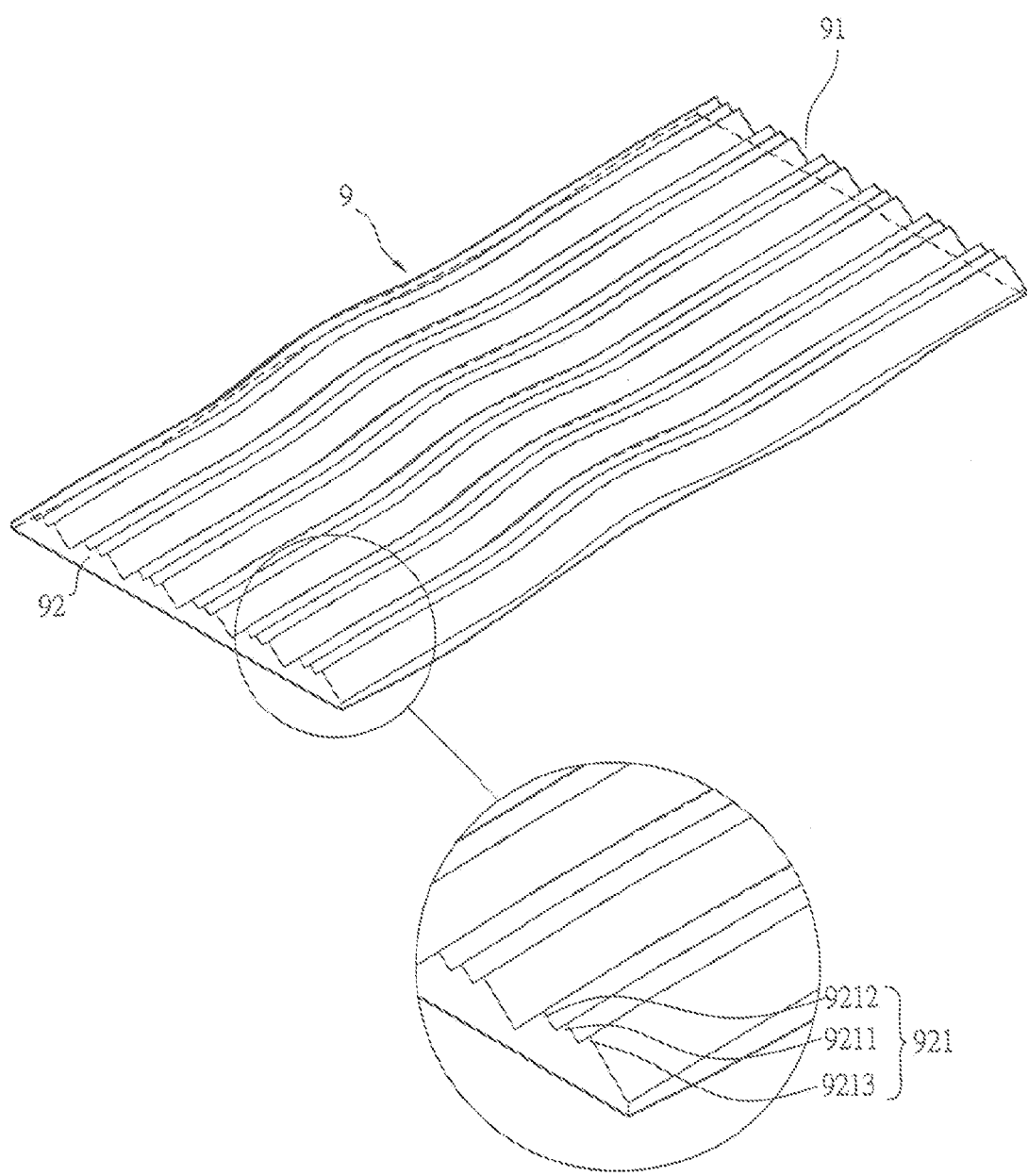
FIG. 32 shows a perspective view of an optic film constructed In accordance with a fourteenth embodiment of the present invention.
Figure 33:
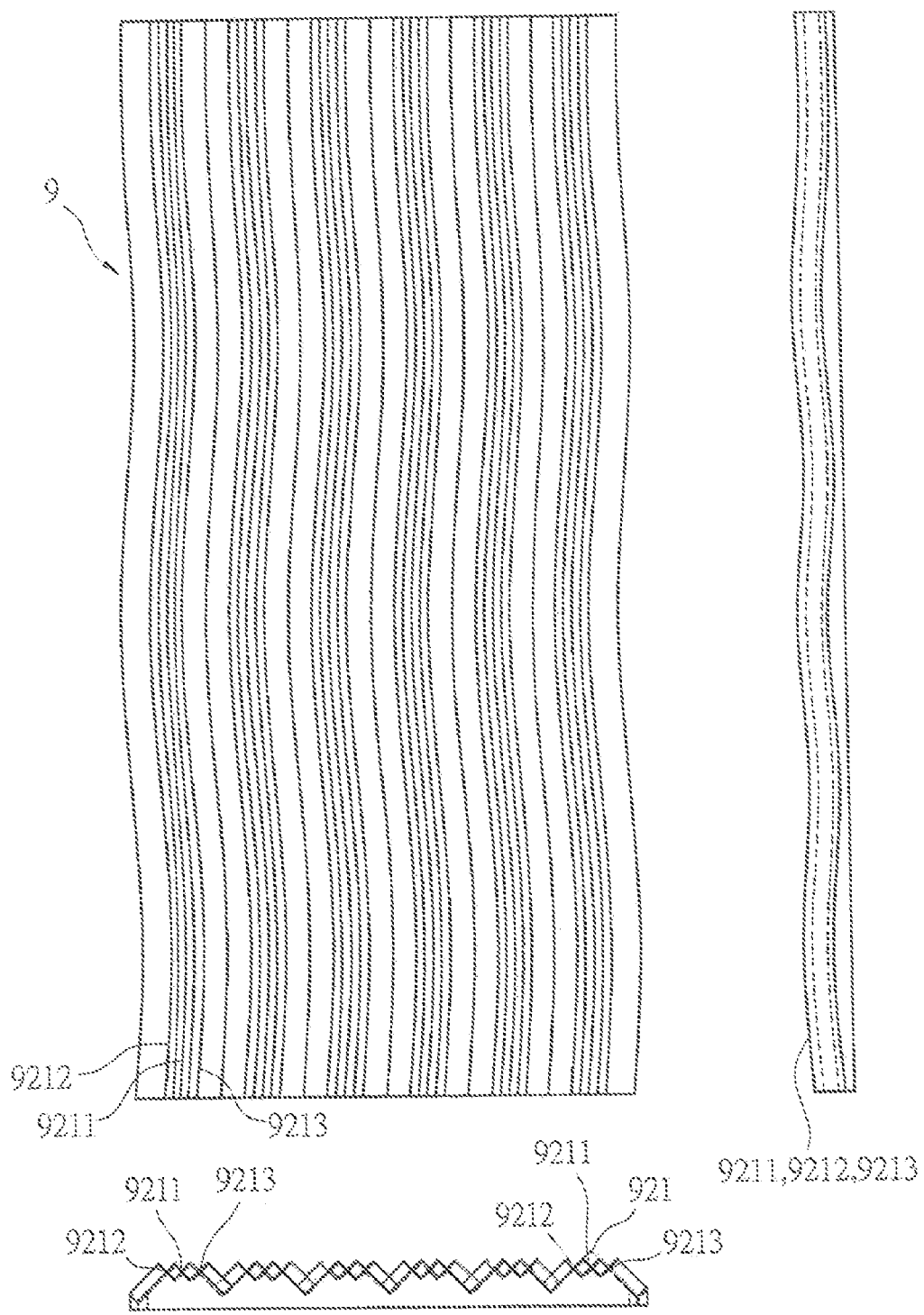
FIG. 33 shows a top plan view; an end view, and a side elevational view of the optic film of FIG. 32.

Referring to FIGS. 32 and 33, to embody the optic film 9 in accordance with a further embodiment of the present invention, the ridges 9211,9212, 9213 of each micro light guide 92 are all made both a continuous left-and-right wavy configuration, and a continuous up-and-down height-variation configuration. As such, light transmitting through the micro light guide 92 can be of variations, so that the light induces no interference pattern in a liquid crystal display panel when the light passes through thin-film transistors and color filters of the liquid crystal display panel.

Figure 34:
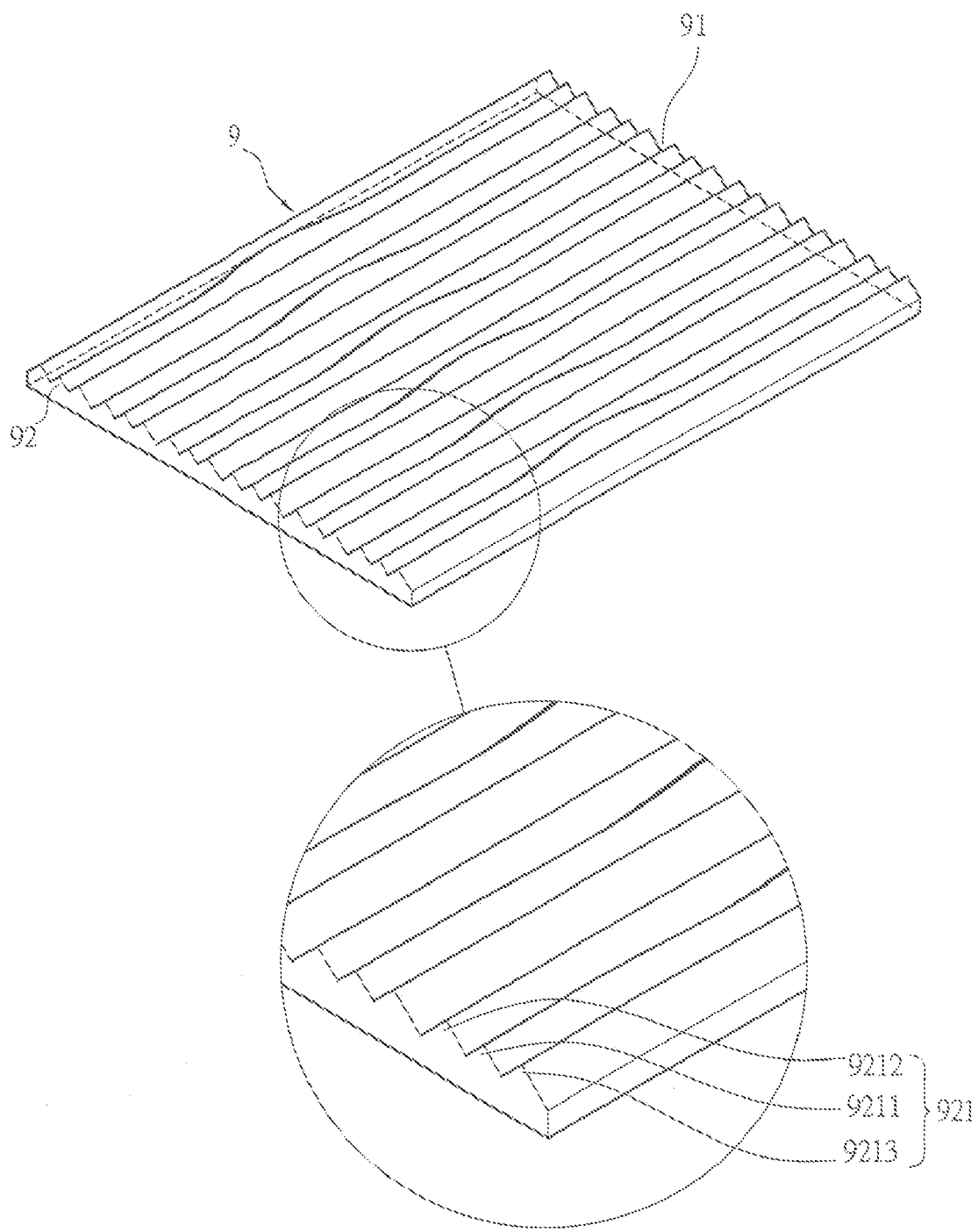
FIG. 34 shows a perspective view of an optic film, constructed in accordance with a fifteenth embodiment of the present invention.
Figure 35:
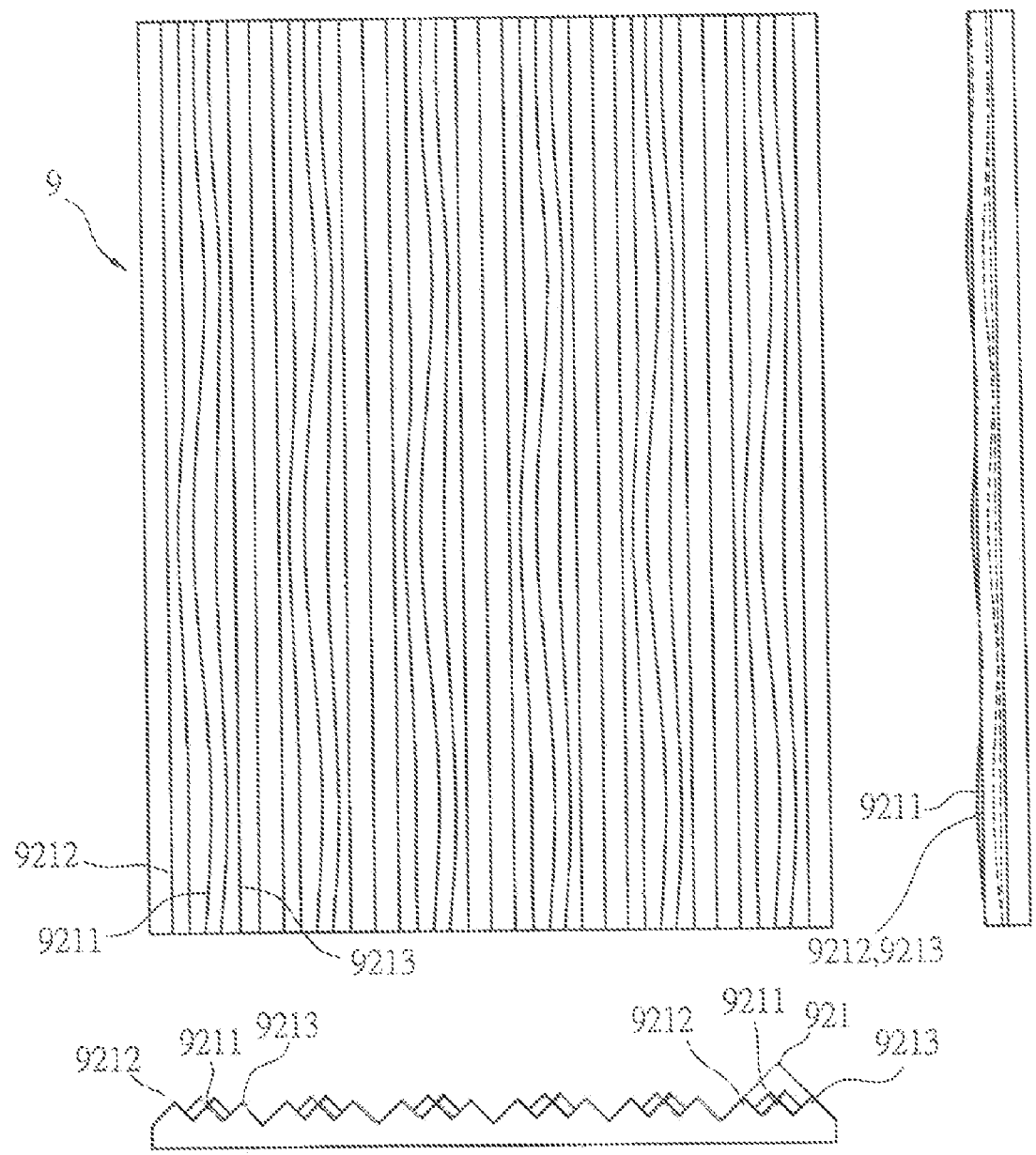
FIG. 35 shows a top plan view, an end view, and a side elevational view of the optic film of FIG. 34.
Figure 36:
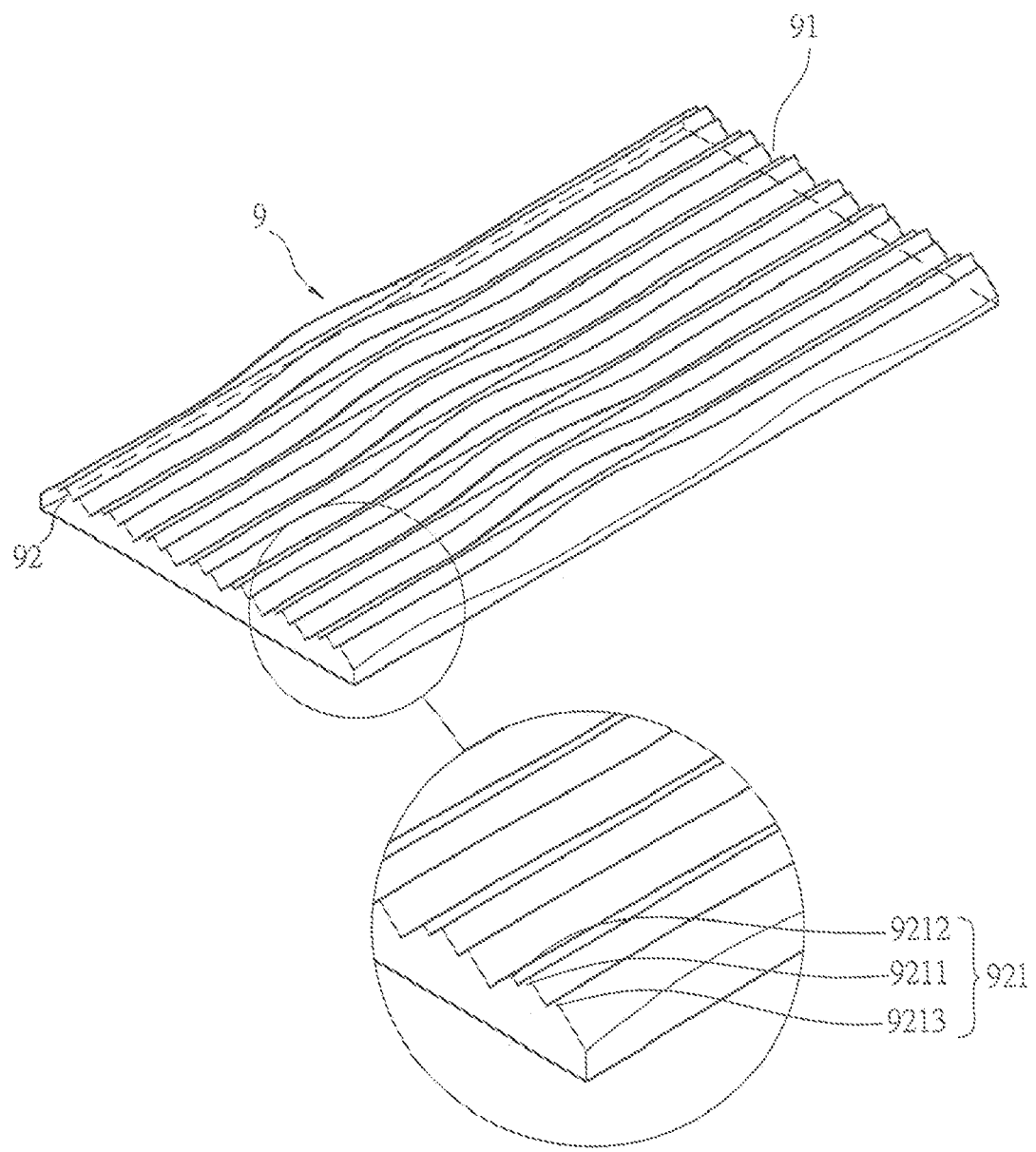
FIG. 36 shows a perspective view of an optic film constructed in accordance with a sixteenth, embodiment of the present inversion.
Figure 37:
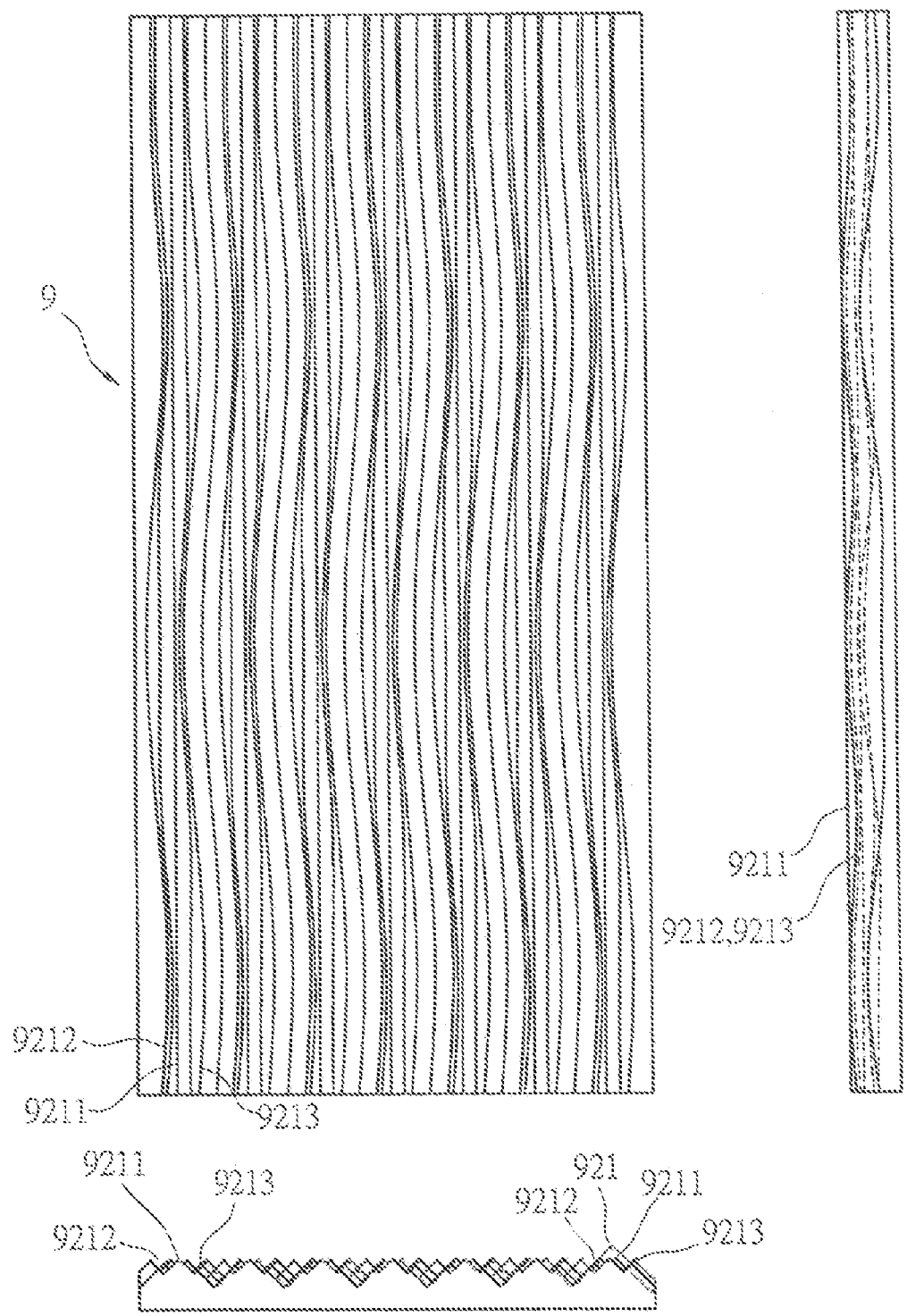
FIG. 37 shows a top plan view, an end view; and a side elevational view of the optic film of FIG. 32.

Referring to FIGS. 34 and 35, to embody die optic film 9 in accordance with a further embodiment of die present invention, a central ridge 9211 of the micro light guide 92 is marie both a continuous left-and-right wavy configuration and a continuous up-and-down height-variation configuration, while side ridges 9212,9213, which are located, on opposite sides of die central ridge 9211, are made straight linear. As such, light transmitting through die micro light guide 92 can lie of variations, so mat die light induces no interference pattern in a liquid crystal display panel when tire light passes through thin-transistors and color filters of die liquid crystal display panel Referring to FIGS. 36 and 37, to embody the optic film 9 in accordance with a further embodiment of die present invention, a central ridge 9211 of fee micro light guide 92 is made straight, linear, while side ridges 9212,9213, which are located on opposite sides of the central ridge 9211, are made both a continuous left-and-right wavy configuration and a continuous up-and-down height-variation configuration. As such, light transmitting through the micro light guide 92 can be of variations, so feat, fee light induces no interference pattern In a liquid crystal display panel when the light passes through thin-film transistors and color filters of the liquid crystal display panel.

The features of die present invention reside in that light converging elements 531 that are raised or recessed with respect to the light emitting surface 53 of die light guide board 5 are formed on the light emitting surface 53 of the light guide board 5, which together with an optic film 7 that forms micro light guides 71, makes the light transmitting through the light converging elements 531 irregular so that the light: induces no interference pattern when the light passes through the thin-film, transistors and color filters of die liquid crystal display panel.

The present invention can also be embodied by alternatively or additionally forming light converging elements on the reflection surface 52 of the light guide 5, which together with the above described optic film 7, makes the light transmitting through the light converging elements of die light guide board 5 irregular so that the light induces no interference pattern when, the light passes through the thin-film transistors and color filters of the liquid crystal display panel.

Although die present invention has been described with reference to the preferred embodiments thereof, it is apparent to those skilled in die art that a variety of modifications and changes may be made without departing from the scope of die present invention which is intended to be defined by the appended claims.

It will be understood dial each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of die device illustrated and in its operation can be made by those skilled in the art without departing in airy way from the spirit of the present invention.

I claim:

1. A backlight module comprising:
a light guide board, having at least a light incidence surface, a reflection surface, and a light emitting surface, either the light emitting surface or the reflection surface forming a plurality of light converging elements each having a base having a geometry formed by two arcuate lines facing away from each other and intersecting each other, the light converging element being recessed or raised with respect to the light emitting surface;
a reflector film arranged outside the reflection surface of the light guide board;
an optic film arranged on the light guide board and having a surface forming a plurality of micro light guides each comprising at least two ridges of different heights whereby the ridges comprise at least one low ridge and at least one high ridge, the low ridge of the micro light guides being of a continuous left-and-right wavy configuration; and
a light source arranged at the light incidence surface of the light guide board.

2. The backlight module as claimed in claim 1, wherein the light converging elements comprise a plurality of sectioned triangular prisms.

3. The backlight module as claimed in claim 1, further comprising an upper diffuser film arranged on the light guide board.

4. The backlight module as claimed in claim 1, wherein the high ridge of the micro light guides is of a continuous left-and-right wavy configuration.

5. The backlight module as claimed in claim 1, wherein the low ridge of the micro light guide is of a continuous up-and-down height-variation configuration.

6. The backlight module as claimed in claim 1, wherein the high ridge of the micro light guide is of a continuous up-and-down height-variation configuration.

7. The backlight module as claimed in claim 1, wherein the high ridge of the micro light guide is of both a continuous left-and-right wavy configuration and a continuous up-and-down height-variation configuration.

8. A backlight module comprising:
a light guide board, having at least a light incidence surface, a reflection surface, and a light emitting surface, either the light emitting surface or the reflection surface forming a plurality of light converging elements each having a base having a geometry formed by two arcuate lines facing away from each other and intersecting each other;
a reflector film arranged outside the reflection surface of the light guide board;
an optic film arranged on the light guide board and having a surface forming a plurality of micro light guides each comprising at least two ridges, which are of identical height, a first number of the ridges of the micro light guides being of a continuous left-and-right wavy configuration, while a second number of the ridges being of a straight linear configuration; and
a light source arranged outside the light incidence surface of the light guide board.

9. The backlight module as claimed in claim 8, wherein the light converging elements comprise a plurality of sectioned triangular prisms.

10. The backlight module as claimed in claim 8, wherein the light converging elements are raised or recessed.

11. The backlight module as claimed in claim 8, further comprising an upper diffuser film arranged on the light guide board.

12. The backlight module as claimed in claim 8, wherein each ridge of the micro light guide is of a continuous up-and-down height-variation configuration.

* * * * *